US009045568B2

(12) United States Patent
Giesbrecht et al.

(10) Patent No.: US 9,045,568 B2
(45) Date of Patent: *Jun. 2, 2015

(54) VINYL TERMINATED POLYETHYLENE WITH LONG CHAIN BRANCHING

(71) Applicants: ExxonMobil Chemical Patents Inc., Baytown, TX (US); Ramot at Tel-Aviv University Ltd., Tel Aviv (IL)

(72) Inventors: Garth R. Giesbrecht, The Woodlands, TX (US); Matthew W. Holtcamp, Huffman, TX (US); Moshe Kol, Ramat Gan (IL)

(73) Assignees: ExxonMobil Chemical Patents Inc., Baytown, TX (US); Ramot at Tel-Aviv University Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,868

(22) Filed: Jun. 19, 2013

(65) Prior Publication Data

US 2014/0039140 A1 Feb. 6, 2014

Related U.S. Application Data

(60) Provisional application No. 61/679,579, filed on Aug. 3, 2012.

(51) Int. Cl.
C08F 4/76 (2006.01)
C08F 4/64 (2006.01)
C08F 4/52 (2006.01)

(52) U.S. Cl.
CPC ... *C08F 4/76* (2013.01); *C08F 4/52* (2013.01); *C08F 4/64189* (2013.01)

(58) Field of Classification Search
CPC .................................................. C08F 4/64189
USPC .................. 526/172, 161, 351, 352
See application file for complete search history.

(56) References Cited

U.S. PATENT DOCUMENTS

| 4,066,715 | A | 1/1978 | Isa et al. |
|---|---|---|---|
| 5,153,157 | A | 10/1992 | Hlatky et al. |
| 5,942,459 | A | 8/1999 | Sugano et al. |
| 5,998,645 | A | 12/1999 | Nestler |
| 6,309,997 | B1 | 10/2001 | Fujita et al. |
| 6,399,724 | B1 | 6/2002 | Matsui et al. |
| 6,462,136 | B1 | 10/2002 | Saito |
| 6,531,555 | B2 | 3/2003 | Whiteker |
| 6,548,723 | B2 | 4/2003 | Bagheri et al. |
| 6,632,899 | B2 * | 10/2003 | Kol et al. ......... 526/129 |
| 6,686,490 | B1 * | 2/2004 | Kol et al. ......... 556/56 |
| 6,699,824 | B1 | 3/2004 | Dawson et al. |
| 7,105,703 | B1 | 9/2006 | Atwood |
| 7,144,839 | B2 | 12/2006 | Gibson et al. |
| 7,241,714 | B2 | 7/2007 | Boussie et al. |
| 7,300,903 | B2 | 11/2007 | Fujita et al. |
| 7,385,015 | B2 | 6/2008 | Holtcamp |
| 7,531,602 | B2 | 5/2009 | Hoang et al. |
| 7,544,749 | B2 | 6/2009 | Jones et al. |
| 7,696,123 | B2 | 4/2010 | Schneider et al. |
| 7,812,184 | B2 | 10/2010 | Kondo et al. |
| 7,880,047 | B2 | 2/2011 | Knowles et al. |
| 7,989,565 | B2 | 8/2011 | Gibson et al. |
| 8,058,373 | B2 | 11/2011 | Stevens et al. |
| 8,101,696 | B2 | 1/2012 | Konze et al. |
| 8,202,953 | B2 | 6/2012 | Konze et al. |
| 8,222,358 | B2 | 7/2012 | Rodriguez et al. |
| 8,299,189 | B2 | 10/2012 | Boone et al. |
| 8,450,438 | B2 | 5/2013 | Aboelella et al. |
| 8,907,032 | B2 | 12/2014 | Kol et al. |
| 2002/0173604 | A1 | 11/2002 | Kol et al. |
| 2003/0105250 | A1 | 6/2003 | Whiteker |
| 2004/0167016 | A1 | 8/2004 | Holtcamp et al. |
| 2005/0075242 | A1 | 4/2005 | Holtcamp et al. |
| 2005/0227860 | A1 | 10/2005 | Green et al. |
| 2006/0100092 | A1 | 5/2006 | Jones et al. |
| 2007/0021561 | A1 | 1/2007 | Tse et al. |
| 2007/0208148 | A1 | 9/2007 | Rodriguez et al. |
| 2008/0108499 | A1 | 5/2008 | Coates et al. |
| 2009/0043100 | A1 | 2/2009 | Kondo et al. |
| 2009/0099381 | A1 | 4/2009 | Katsuki et al. |
| 2009/0186995 | A1 | 7/2009 | Canich et al. |
| 2009/0318640 | A1 | 12/2009 | Brant et al. |
| 2009/0318644 | A1 | 12/2009 | Brandt et al. |
| 2010/0029871 | A1 | 2/2010 | Crowther et al. |
| 2010/0081808 | A1 | 4/2010 | Kondo et al. |
| 2010/0298510 | A1 | 11/2010 | Crowther et al. |
| 2011/0124831 | A1 | 5/2011 | Luo |
| 2011/0152497 | A1 | 6/2011 | Allen et al. |
| 2011/0306740 | A1 | 12/2011 | Nagy et al. |

(Continued)

FOREIGN PATENT DOCUMENTS

CN 101080399 11/2007
CN 101437827 5/2009

(Continued)

OTHER PUBLICATIONS

PCT/US2013/046615 International Search Report and Written Opinion, Nov. 13, 2013.
PCT/US2013/053363 International Search Report and Written Opinion, Nov. 12, 2013.
Arredondo,Yolanda et al., Non-Catalyzed C-Alkylation of Phenols with Cyclic Secondary Alkyl Bromies, Synthetic Communications, 1996, vol. 26, No. 21, pp. 3885-3895.
Bryliakov, K. et al, Titanium-Salan-Catalyzed Asymmetric Oxidation of Sulfides and Kinetic Resolution of Sulfoxides with H2O2 as the Oxidant, Eur. J. Org. Chem., 2008, pp. 3369-3376.
Busico, Vincenzo et al, New Evidence on the Nature of the Active Sites in Heterogeneous Ziegler-Natta Catalysts for Propene Polymerization, 1997, Macromolecules, vol. 30, pp. 4786-4790.
Busico, Vincenzo et al., Mimicking Ziegler-Natta Catalysts in Homogeneous Phase, 1 C2-Symmetric Octahedral Zr (IV) Complexes with Tetradentate [ONNO]-Type Ligands, Macromol. Rapid Commun. 2001, vol. 22, No. 17, pp. 1405-1409.

(Continued)

*Primary Examiner* — Rip A Lee
(74) *Attorney, Agent, or Firm* — Daniel N. Lundeen; Lundeen & Lundeen PLLC

(57) ABSTRACT

Vinyl terminated polyolefins with long chain branching produced with Salan catalysts having carbazole moieties.

37 Claims, No Drawings

(56) References Cited

U.S. PATENT DOCUMENTS

| | | | |
|---|---|---|---|
| 2011/0319578 A1 | 12/2011 | Hanaoka et al. | |
| 2012/0184676 A1 | 7/2012 | Gahleitner et al. | |
| 2012/0245312 A1 | 9/2012 | Holtcamp | |
| 2012/0316302 A1 | 12/2012 | Stewart | |
| 2013/0030135 A1 | 1/2013 | Hagadorn et al. | |
| 2013/0096271 A1* | 4/2013 | Kol et al. | 526/172 |
| 2013/0253244 A1 | 9/2013 | Emett et al. | |
| 2013/0310529 A1* | 11/2013 | Kol et al. | 526/172 |
| 2014/0039137 A1 | 2/2014 | Giesbrecht et al. | |
| 2014/0039138 A1 | 2/2014 | Giesbrecht et al. | |
| 2014/0039139 A1 | 2/2014 | Giesbrecht et al. | |
| 2014/0039140 A1 | 2/2014 | Giesbrecht et al. | |
| 2014/0039141 A1 | 2/2014 | Giesbrecht et al. | |

FOREIGN PATENT DOCUMENTS

| | | |
|---|---|---|
| CN | 101080399 | 12/2012 |
| EP | 1849775 | 10/2007 |
| EP | 1849778 | 10/2007 |
| EP | 2003135 | 12/2008 |
| EP | 2532687 | 12/2012 |
| JP | 2007284438 | 11/2007 |
| WO | 9806072 | 2/1998 |
| WO | 0236638 | 5/2002 |
| WO | 03091292 | 11/2003 |
| WO | 2004069881 | 8/2004 |
| WO | 2007007893 | 1/2007 |
| WO | 2009027516 | 3/2009 |
| WO | 2011019474 | 2/2011 |
| WO | 2011058241 | 12/2011 |
| WO | 2011158241 | 12/2011 |
| WO | 2012004680 | 1/2012 |
| WO | 2012098521 | 1/2012 |
| WO | 2013043796 | 3/2013 |

OTHER PUBLICATIONS

Busico, Vincenzo et al., The first Molecularly Characterized Isotactic Polypropylene-block-polyethylene Obtained via "Quasi-Living" Insertion Polymerization, Macromolecules, 2003, vol. 36, No. 11, pp. 3806-3808.

Busico, Vincenzo et al., Block Copolymers of Highly Isotactic Polypropylene via Controlled Ziegler-Natta Polymerization, Macromolecules, 2004, vol. 37, No. 22, pp. 8201-8203.

Busico, Vincenzo et al., Design of stereoselective Ziegler—Natta propene polymerization catalysts, PNAS, 2006, vol. 103, No. 42, pp. 15321-15326.

Ciancaleoni, Gianluca et al., Structure/Properties Relationship for Bis{phenoxyamine}Zr(IV)-Based Olefin Polymerization Catalysts: A Simple OFT Model to Predict Catalytic Activity, Macromolecules, 2012, vol. 45, pp. 4046-4053.

Cipullo, Roberta et al., Improving the Behavior of Bis(phenoxyamine) Group 4 Metal Catalysts for Controlled Alkene Polymerization, 2009, Macromolecules, vol. 42, pp. 3869-3872.

Clarkson, Guy et al., Group 4 catalysts for ethene polymerization containing tetradentate salicylaldiminato ligands, 2006, Dalton Trans., pp. 5484-5491.

Cohen, AD et al., Construction of C1-symmetric zirconium complexes by the design of new Salan ligands. Coordination chemistry and preliminary polymerisation catalysis studies, Chem. Commun, 2008, pp. 2149-2151.

Cohen, AD et al., C1-Symmetric Zirconium Complexes of [ONNO#]-Type Salan Ligands: Accurate Control of Catalyst Activity, Isospecificity, and Molecular Weight in 1-Hexene Polymerization, Organometallics, 2009, vol. 28, No. 5, pp. 1391-1405.

Cohen, AD et al., Same Ligand, Different Metals: Diiodo-Salan Complexes of the Group 4 Triad in Isospecific Polymerization of 1-Hexene and Propylene, Macromolecules, 2010, vol. 43, No. 4, pp. 1689-1691.

Corradini, Paolo et al., Do New Century Catalysts Unravel the Mechanism of Stereocontrol of Old Ziegler—Natta Catalysts?, Accounts of Chemical Research, 2004, vol. 37, No. 4, pp. 231-241.

Demetgul, Cahit et al., Synthesis and characterization of a Schiff base derived from 2-aminobenzylamine and its Cu(II) complex: electropolymerization of the complex on a platinum electrode, Journal of Coordination Chemistry, 2010, vol. 63, No. 12, pp. 2181-2191.

Egami, Hiromichi et al., Fe(salan)-Catalyzed Asymmetric Oxidation of Sulfides with Hydrogen Peroxide in Water, 2007, J. Am. Chem. Soc., vol. 129, pp. 8940-8941.

Egami, Hiromichi et al., Nb(salan)-Catalyzed Asymmetric Epoxidation of Allylic Alcohols with Hydrogen Peroxide, 2008, J. Am. Chem. Soc., vol. 47, pp. 5171-5174.

Egami, Hiromichi et al., Oxidation Catalysis of Nb(Salan) Complexes: Asymmetric Epoxidation of Allylic Alcohols Using Aqueous Hydrogen Peroxide as an Oxidant, 2010, J. Am. Chem. Soc., vol. 132, pp. 5886-5895.

Egami, Hiromichi et al., Enantioenriched Synthesis of C1-Symmetric BINOLs: Iron-Catalyzed Cross-Coupling of 2-Naphthols and Some Mechanistic Insight, 2010, J. Am. Chem. Soc., vol. 132, pp. 13633-13635.

Gendler, Shimrit, et al., Titanium and Zirconium Complexes of Robust Salophan Ligands. Coordination Chemistry and Olefin Polymerization Catalysis, J. Am. Chem. Soc., 2008, vol. 130, pp. 2144-2145.

Groysman, Stanislav et al., Salophan Complexes of Group IV Metals, Eur. J. Inorg. Chem. 2005, pp. 2480-2485.

Kondo, Shoichi et al., A μ-Oxo-μ-η2 :η2-Peroxo Titanium Complex as a Reservoir of Active Species in Asymmetric Epoxidation Using Hydrogen Peroxide, 2008, Agnew. Chem. Int. Ed., vol. 47, pp. 10195-10198.

Lamberti, Marina et al., Mechanism of stereospecific polymerization of β-olefins by late-transition metal and octahedral group 4 metal catalysts, Coord. Chem. Rev. vol. 253, 2009, pp. 2082-2097.

Leflon, P. et al., Determination of aluminum in bone in haemodialyzed patients, using inductively coupled argon plasma emission spectrometry, Clinica Chimica Acta, 1990, vol. 191, issues 1-2, pp. 31-38.

Manna, Cesar M. et al., Markedly different cytotoxicity of the two enantiomers of C2-symmetrical Ti(IV) phenolato complexes; mechanistic implications, 2010, Dalton Trans., vol. 39, pp. 1182-1184.

Matsumoto, Kazuhiro et al., Asymmetric catalysis of metal complexes with non-planar ONNO ligands: salen, salalen and salan, Chem. Commun., 2007, pp. 3619-3627.

Matsumoto, Kazuhiro et al., Asymmetric epoxidation of olefins catalyzed by Ti(salan) complexes using aqueous hydrogen peroxide as the oxidant, 2008, Pure and Applied Chemistry, vol. 80, pp. 1071-1077.

Matsumoto, Kazuhiro et al., Highly Enantioselective Epoxidation of Styrenes Catalyzed by Proline-Devided C1-Symmetric Titanium(Salan) Complexes, Angew. Chem. Int. Ed. 2009, vol. 48, pp. 7432-7435.

Meker, Sigalit. et al., Major impact of N-methylation on cytotoxicity and hydrolysis of salan Ti(IV) complexes: sterics and electronics are intertwined, 2011, Dalton Trans., vol. 40, pp. 9802-9809.

Nakano, Koji et al., Alternating Copolymerization of Cyclohexene Oxide with Carbon Dioxide Catalyzed by (salalen) CrCl Complexes, Macromelecules, 2009, vol. 42, pp. 6972-6980.

Press, Konstantin et al., Salalen Titanium Complexes in the Highly Isospecific Polymerization of 1-Hexene and Propylene, Angew. Chem., Int. Ed., 2011, vol. 50, pp. 3529-3532.

Press, Konstantin et al., Zirconium and hafnium Salalen complexes in isospecific polymerisation of propylene, Dalton Trans., 2013, vol. 42, pp. 9096-9103.

Sawada, Yuji, et al., Titanium—Salan-Catalyzed Asymmetric Epoxidation with Aqueous Hydrogen Peroxide as the Oxidant, Agnew. Chem. Int. Ed., 2006, vol. 45, pp. 3478-3480.

Segal, Sharon et al., Isospecific Polymerization of Vinylcyclohexane by Zirconium Complexes of Salan Ligands, Macromolecules, 2008, vol. 41, No. 5, pp. 1612-1617.

Segal, Sharon et al., Zirconium and Titanium Diamine Bis(phenolate) Catalysts for α-Olefin Polymerization: From Atactic Oligo(1-hexene) to Ultrahigh-Molecular-Weight Isotactic Poly(1-hexene), Organomellics, 2005, vol. 24, No. 2, pp. 200-202.

(56) References Cited

OTHER PUBLICATIONS

Sergeeva, Ekaterina et al., Salan ligands assembled around chiral bipyrrolidine: predetermination of chirality around octahedral Ti and Zr centres, Chem. Commun, 2009, pp. 3053-3055.
Sergeeva, Ekaterina et al., 2,2'-Bipyrrolidine versus 1,2-Diaminocyclohexane as Chiral Cores for Helically Wrapping Diamine-Diolate Ligands, Inorganic Chemistry, 2009, vol. 48, No. 17, pp. 8075-8077.
Seyforth, Dietmar, Alkyl and Aryl Derivatives of the Alkali Metals: Strong Bases and Reactive Nucleophiles. 2. Wilhelm Schlenk's Organoalkali-Metal Chemistry. The Metal Displacement and the Transmetalation Reactions. Metalation of Weakly Acidic Hydrocarbons. Superbases, Organometallics, 2009, vol. 28, pp. 2-33.
Stopper, Ayellet et al., Ring-Opening Polymerization of Lactide with Zr Complexes of {ONSO} Ligands: From Heterotactically Inclined to Isotactically Inclined Poly(lactic acid), Macromelecules, 2012, vol. 45, pp. 698-704.
Strianese M., et al., A Comparative Study on the Polymerization of α-Olefins Catalyzed by Salen and Salan Zirconium ComplexesMacromol. Chem. Phys. 2008, vol. 209, pp. 585-592.
Talarico, Giovanni et al., Origin of the Regiochemistry of Propene Insertion at Octahedral col. 4 Polymerization Catalysts: Design or Serendipity?, J. Am. Chem. Soc., 2003, vol. 125, pp. 7172-7173.
Tshuva, Edit Y. et al., Isospecific Living Polymerization of 1-Hexene by a Readily Available Nonmetallocene C2-Symmetrical Zirconium Catalyst, J. Am. Chem. Soc., 2000, vol. 122, pp. 10706-10707.
Yeori et al., Salalen: a hybrid Salan/Salen tetradentate [ONNO]-type ligand and its coordination behavior with group IV metals, Inorg. Chem. Commun., vol. 7, 2004, pp. 280-282.
Yeori, Adi et al., Diastereoisomerically Selective Enantiomerically Pure Titanium Complexes of Salan Ligands: Synthesis, Structure, and Preliminary Activity Studies, Inorganic Chemistry, 2005, vol. 44, No. 13, pp. 4466-4468.
Yeori, Adi et al., Diastereomerically-Specific Zirconium Complexes of Chiral Salan Ligands: Isospecific Polymerization of 1-Hexene and 4-Methyl-1-pentene and Cyclopolymerization of 1,5-Hexadiene, J. Am. Chem. Soc, 2006, vol. 128, pp. 13062-13063.
Yeori, Adi et al., Cyclopolymerization of 1,5-Hexadiene by Enantiomerically-Pure Zirconium Salan Complexes. Polymer Optical Activity Reveals α-Olefin Face Preference, Macromolecules, 2007, vol. 40, No. 24, pp. 8521-8523.
Zucchini, U. et al., Synthesis and Properties of Some Titanium and Zirconium Benzyl Derivatives, J. Organomet. Chem., 1971, vol. 26, pp. 357-372.
PCT/US2013/046538 International Search Report and Written Opinion, Nov. 8, 2013.
PCT/US2013/046582 International Search Report and Written Opinion, Nov. 5, 2013.
PCT/US2013/046601 International Search Report and Written Opinion, Nov. 13, 2013.
PCT/IL2011/000482 International Search Report and Written Opinion, Jan. 13, 2013.
Berkessel, Albrecht et al., Ligands: Highly Enantioselective Titanium In Situ Catalysts for Asymmetric Epoxidation with Aqueous Hydrogen Peroxide, Adv. Synth Catal, 2007, vol. 349, pp. 2385-2391.
Whitelaw, Emma L. et al., Group 4 Salalen Complexes and Their Application for the Ring-Opening Polymerization of rac-Lactide, Inorg. Chem., 2010, vol. 49, pp. 7176-7181.
PCT/US2013/69419 International Search Report and Written Opinion, Mar. 7, 2014.
PCT/US2013/46569 International Search Report and Written Opinion, Jun. 13, 2014.
PCT/US2014/041362-ISR and WO, Oct. 1, 2014.
PCT/US2014/039786-ISR and WO, Sep. 29, 2014.
PCT/US2014/039766-ISR and WO, Oct. 31, 2014.

Immel et al., Cytotoxic dinuclear titanium-salan complexes: Structural and biological characterization, Journal of Inorganic Biochemistry, 2012, vol. 106, pp. 68-75.
Busico et al. "Living Ziegler-Natta Polymerization: True or False?", Macromolecules Symposium, 226: 1-16, 2005.
Busico et al. "Reactivity of Secondary Metal-Alkyls in Catalytic Propene Polymerization: How Dormant Are 'Dormant Chains'?", Journal of the American Chemical Society, 127(6): 1608-1609, 2005.
Ciancaleone et al. "Activation of a Bis(Phenoxy-Amine) Precatalyst for Olefin Polymerization: First Evidence for an Outer Sphere Ion Pair With the Methylborate Counterion", Dalton Transactions, P.8824-8827, 2009.
Ciancaleone et al. "Stucture-Activity Relationship in Olefin Polymerization Catalysis: Is Entropy the Key?", Journal of the American Chemical Society, JACS, 132: 13651-13653, 2010.
Tshuva et al. "Single-Step Synthesis of Salans and Substituted Salans by Mannich Condensation", Tetrahedron Letters, 42: 6405-6407, 2001.
Official Action Dated Sep. 6, 2013 From the US Patent and Trademark Office Re. U.S. Appl. No. 13/805,011.
Restriction Official Action Dated May 13, 2013 From the US Patent and Trademark Office Re. U.S. Appl. No. 13/805,011.
Notice of Allowance Dated Jul. 1, 2014 From the US Patent and Trademark Office Re. U.S. Appl. No. 13/805,011.
Communication Pursuant to Article 94(3) EPC Dated Mar. 14, 2014 From the European Patent Office Re. Application No. 11736169.1.
Communication Relating to the Results of the Partial International Search Dated Apr. 19, 2012 From the International Searching Authority Re. Application No. PCT/IB2012/050267.
Corrected International Search Report and the Written Opinion Dated Sep. 25, 2012 From the International Searching Authority Re. Application No. PCT/IB2012/050267.
International Search Report and the Written Opinion Dated Jun. 19, 2012 From the International Searching Authority Re. Application No. PCT/IB2012/050267.
Office Action Dated Jul. 28, 2014 From the State Intellectual Property Office of the People's Republic of China Re. Application No. 201180039237.5.
Search Report Dated Jul. 28, 2014 From the State Intellectual Property Office of the People's Republic of China Re. Application No. 201180039237.5.
International Preliminary Report and the Written Opinion on Patentability Dated Jan. 3, 2013 From the International Bureau of WIPO Re. Application No. PCT/IL2011/000482.
International Search Report Dated Dec. 5, 2011 From the International Searching Authority Re. Application No. PCT/IL2011/000482.
International Preliminary Report and Written Opinion on Patentability Dated Jul. 23, 2013 From the International Bureau of WIPO Re. Application No. PCT/IB2012/050267.
Office Action Dated Jul. 28, 2014 From the State Intellectual Property Office of the People's Republic of China Re. Application No. 201180039237.5 Translation Into English.
Sanz et al. "Monocyclopentadienyl Bis(phenoxo-imino) Zirconium Complexes as Precatalyst Species for Olefin Polymerization. Stereospecific Methylation of an Imino Group with Formation of a Zirconium-amido Bond", Organometallics, 23: 5324-5331, 2004.
Plass "Synthese, Struktur and Oxotransferreaktionen von Dioxomolybdan (VI)—Komplexen mit mehrzahnigen Aminoalkoholen als Liganden", Z. anorg. allg. Chem., 623 (1997) 997-1005.
Rajendiran et al, "Cleavage of Proteins by a Mixed-Ligand Copper (II) Phenolate Complex: Hydrophobicity of the Diimine Coligand Promotes Cleavage", Inorg. Chem., 2007, 46: 10446-10448.
Allard et al., "Sequential Phenolate Oxidations in Octahedral Cobalt (III) Complexes with [N1O3] Ligands", European Journal of Inorganic Chemistry 2012, 29: 4622-4631.

* cited by examiner

VINYL TERMINATED POLYETHYLENE WITH LONG CHAIN BRANCHING

RELATED APPLICATIONS

This application claims priority to and the benefit of provisional application U.S. 61/679,579, filed Aug. 3, 2012.

NAMES OF PARTIES TO JOINT RESEARCH AGREEMENT (1) ExxonMobil Chemical Company, A Division of ExxonMobil Corporation; (2) Ramot at Tel Aviv University Ltd.

FIELD OF THE INVENTION

This invention relates to vinyl terminated ethylene polymers and/or polymers having long chain branching made with novel catalyst compounds comprising Salan ligands.

BACKGROUND OF THE INVENTION

Olefin polymerization catalysts are of great use in industry. Hence there is interest in finding new catalyst systems that increase the commercial usefulness of the catalyst and allow the production of polymers having improved properties.

There is a need in the art for new and improved catalysts and catalyst systems to obtain new and improved polyolefins, polymerization processes, and the like. Accordingly, there is a need in the art for new and improved catalyst systems for the polymerization of olefins, in order to achieve specific polymer properties, such as high polymer melting point, high polymer molecular weights, long chain branching, vinyl termination, to increase conversion or comonomer incorporation, and/or to alter comonomer distribution without deterioration of the properties of the resulting polymers.

SUMMARY OF THE INVENTION

The instant disclosure is directed to catalyst compounds, catalyst systems comprising such compounds, processes for the preparation of the catalyst compounds and systems, and processes for the polymerization of olefins using such catalyst compounds and systems.

In an embodiment, a process comprises:
contacting one or more olefins with a catalyst system at a temperature, a pressure, and for a period of time sufficient to produce a polyolefin comprising
a) at least 50% allyl chain ends; and
b) an Mn of at least 200 g/mol, as determined by $^1$H NMR;
the catalyst system comprising an activator and a catalyst compound according to Formula I, Formula II, or a combination thereof:
Formula I being represented by:

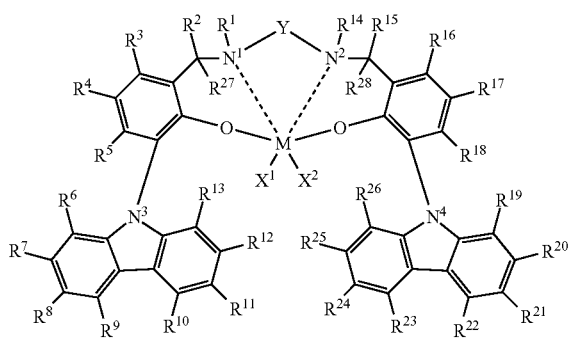

wherein M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and Y is a divalent $C_1$ to $C_{20}$ hydrocarbyl;
Formula II being represented by:

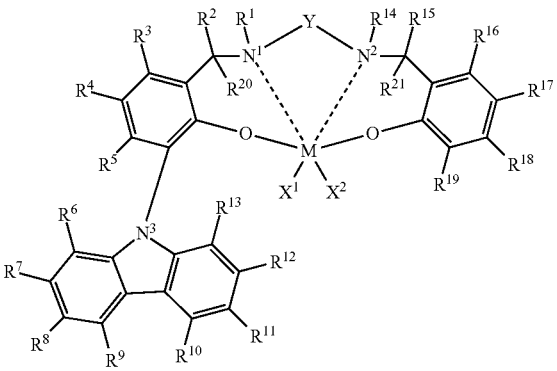

wherein M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and Y is a divalent $C_1$ to $C_{20}$ hydrocarbyl radical.

In an embodiment, a polyolefin polymer comprises:
a) at least 50% allyl chain ends; and
b) an Mn of at least 200 g/mol, as determined by $^1$H NMR;
the polymer produced by a process comprising:
contacting one or more olefins with a catalyst system at a temperature, a pressure, and for a period of time sufficient to produce the polyolefin polymer,
the catalyst system comprising an activator and a catalyst compound according to Formula I, Formula II, or a combination thereof:

Formula I being represented by:

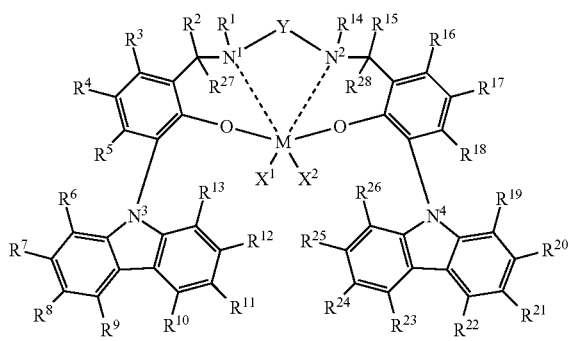

wherein M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and Y is a divalent $C_1$ to $C_{20}$ hydrocarbyl;

Formula II being represented by:

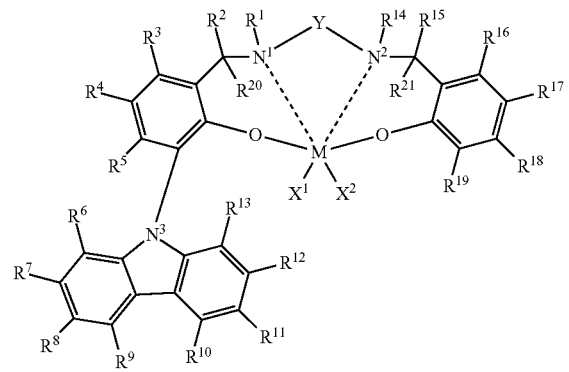

wherein M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and Y is a divalent $C_1$ to $C_{20}$ hydrocarbyl radical.

DETAILED DESCRIPTION

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

In the structures depicted throughout this specification and the claims, a solid line indicates a bond, an arrow indicates that the bond may be dative, and each dashed line represents a bond having varying degrees of covalency and a varying degree of coordination.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition two or more such hydrocarbyl radicals may together form a fused ring system, including partially or fully hydrogenated fused ring systems, which may include heterocyclic radicals.

For purposes herein, a carbazole or substituted carbazole radical is represented by the formula:

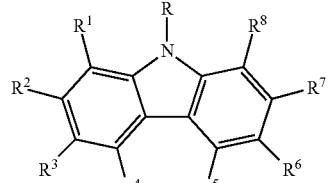

wherein each $R^1$ through $R^8$ is, independently, a hydrogen, a $C_1$-$C_{40}$ hydrocarbyl radical, a functional group comprising elements from Group 13-17 of the periodic table of the elements, or two or more of $R^1$ to $R^8$ may independently join together to form a $C_4$ to $C_{62}$ cyclic or polycyclic ring structure, or a combination thereof.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which may also be referred to as a methyl functional group, ethyl alcohol is an ethyl group, which is the base structure, substituted with an —OH functional group, and pyridine is a phenyl group having a carbon in the base structure of the benzene ring substituted with a nitrogen atom.

For purposes herein, a hydrocarbyl radical may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

For purposes herein, hydrocarbyl radicals may also include isomers of saturated, partially unsaturated and aromatic cyclic structures wherein the radical may additionally be subjected to the types of substitutions described above. The term "aryl", "aryl radical", and/or "aryl group" refers to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Likewise the terms "functional group", "group" and "substituent" are also used interchangeably throughout this document unless otherwise specified. For purposes herein, a functional group includes both organic and inorganic radicals or moieties comprising elements from Groups 13, 14, 15, 16, 17 of the periodic table of elements. Suitable functional groups may include hydrocarbyl radicals, e.g., alkyl radicals, alkene radicals, aryl radicals, and/or halogen (Cl, Br, I, F), O, S, Se, Te, $NR^*_x$, $OR^*$, $SeR^*$, $TeR^*$, $PR^*_x$, $AsR^*_x$, $SbR^*_x$, $SR^*$, $BR^*_x$, $SiR^*_x$, $GeR^*_x$, $SnR^*_x$, $PbR^*_x$, and/or the like, wherein R is a $C_1$ to $C_{20}$ hydrocarbyl as defined above and wherein x is the appropriate integer to provide an electron neutral moiety. Other examples of functional groups include those typically referred to as amines, imides, amides, ethers, alcohols (hydroxides), sulfides, sulfates, phosphides, halides, phosphonates, alkoxides, esters, carboxylates, aldehydes, and the like.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of this disclosure, the term "α-olefin" includes $C_2$-$C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst", "catalyst compound", and "transition metal compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components it is well understood by one of ordinary skill in the art that the ionic form of the component is the form that reacts with the monomers to produce polymers.

For purposes herein the term "catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment a co-activator can be pre-mixed with the catalyst compound to form an alkylated catalyst compound.

A propylene polymer is a polymer having at least 50 mol % of propylene. As used herein, Mn is number average molecular weight as determined by proton nuclear magnetic resonance spectroscopy ($^1$H NMR) unless stated otherwise, Mw is weight average molecular weight determined by gel permeation chromatography (GPC), and Mz is z average molecular weight determined by GPC, wt % is weight percent, and mol % is mole percent. Molecular weight distribution (MWD) is defined to be Mw divided by Mn. Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bz is benzyl, THF is tetrahydrofuran, Mes is mesityl, also known as 1,3,5-trimethylbenzene, Tol is toluene, TMS is trimethylsilyl, TIBAL is triisobutylaluminum, TNOAL is triisobutyl n-octylaluminum, MAO is methylalumoxane, and MOMO is methoxymethoxy (also referred to as methoxymethyl ether).

For purposes herein, RT is room temperature, which is defined as 25° C. unless otherwise specified. All percentages are weight percent (wt %) unless otherwise specified.

In the description herein, the Salan catalyst may be described as a catalyst precursor, a pre-catalyst compound, Salan catalyst compound or a transition metal compound, and these terms are used interchangeably.

Catalyst Compounds

In an embodiment, the catalyst comprises Group 3, 4, 5 and/or 6 disubstituted compounds supported by a tetradentate di-anionic Salan ligand, useful to polymerize olefins and/or α-olefins to produce polyolefins and/or poly(α-olefins). In an embodiment, the catalyst compounds are represented by the following structure:

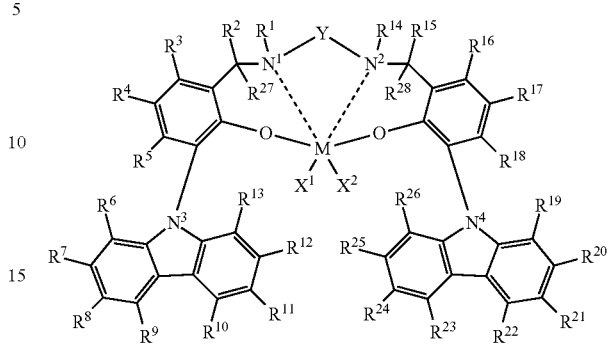

where each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms N$^1$ and N$^2$;

each X is, independently, a univalent C$_1$ to C$_{20}$ hydrocarbyl radical, a functional group comprising elements from Groups 13-17 of the periodic table of the elements, or X$^1$ and X$^2$ join together to form a C$_4$ to C$_{62}$ cyclic or polycyclic ring structure, provided, however, where M is trivalent then X$^2$ is not present;

each R$^1$, R$^2$, R$^3$, R$^4$, R$^5$, R$^6$, R$^7$, R$^8$, R$^9$, R$^{10}$, R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$ and R$^{28}$ is, independently, a hydrogen, a C$_1$-C$_{40}$ hydrocarbyl, a functional group comprising elements from Group 13-17 of the periodic table of the elements, or two or more of R$^1$ to R$^{28}$ may independently join together to form a C$_4$ to C$_{62}$ cyclic or polycyclic ring structure, or a combination thereof; and Y is a divalent hydrocarbyl radical covalently bonded to and bridging between both of the nitrogen atoms N$^1$ and N$^2$. In an embodiment, two or more of R$^1$ to R$^{28}$ may independently join together to form a C$_4$ to C$_{62}$ cyclic or polycyclic ring structure.

In an embodiment, the catalyst compound is represented by the formula:

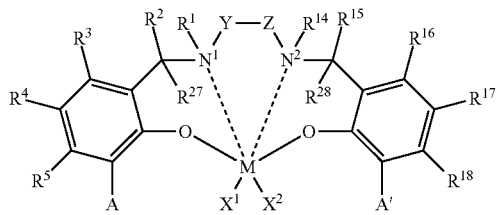

wherein A is represented by the formula, attached to the nitrogen atom, labeled N$^3$ of the carbazole ring:

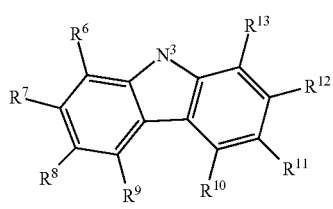

wherein A' is represented by the formula, attached to the nitrogen atom labeled $N^4$ of the carbazole ring:

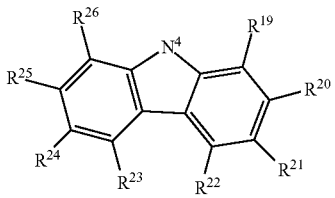

wherein M is a Group 3, 4, 5 or 6 transition metal;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Group 13-17 of the periodic table of the elements, or two or more of $R^1$ to $R^{28}$ may independently join together to form a $C_4$ to $C_{62}$ cyclic or polycyclic ring structure, or a combination thereof and Y and Z form a divalent $C_1$ to $C_{20}$ hydrocarbyl radical. In an embodiment, Y and Z are identical. In an embodiment, Y and Z are different.

In an embodiment, M is a Group 4 metal, or M is Hf, Ti and/or Zr, or M is Hf or Zr. In an embodiment, each of $X^1$ and $X^2$ is independently selected from the group consisting of hydrocarbyl radicals having from 1 to 20 carbon atoms, hydrides, amides, alkoxides having from 1 to 20 carbon atoms, sulfides, phosphides, halides, amines, phosphines, ethers, and combinations thereof.

In an embodiment, $X^1$ and $X^2$ together form a part of a fused ring or a ring system having from 4 to 62 carbon atoms.

In an embodiment, each of $X^1$ and $X^2$ is independently selected from the group consisting of halides, alkyl radicals having from 1 to 7 carbon atoms, benzyl radicals, or a combination thereof.

In an embodiment, Y is a divalent $C_1$-$C_{20}$ hydrocarbyl radical comprising a portion that comprises a linker backbone comprising from 1 to 18 carbon atoms linking or bridging between nitrogen atoms $N^1$ and $N^2$. In an embodiment, Y is a $C_1$-$C_{20}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R*) or N(R*), wherein each R* is independently a $C_1$-$C_{18}$ hydrocarbyl. In an embodiment, Y is selected from the group consisting of ethylene (—CH$_2$CH$_2$—) and 1,2-cyclohexylene, and/or —CH$_2$CH$_2$CH$_2$— derived from propylene. In an embodiment, Y is —CH$_2$CH$_2$CH$_2$— derived from propylene.

In an embodiment, each X is, independently, a halogen or a $C_1$ to $C_7$ hydrocarbyl radical.

In an embodiment, each X is a benzyl radical. In an embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ $R^{20}$, $R^{21}$, $R^{22}$, $R^{23}$, $R^{24}$, $R^{25}$, $R^{26}$, $R^{27}$, and $R^{28}$, is, independently, hydrogen, a halogen, or a $C_1$ to $C_{30}$ hydrocarbyl radical, or a $C_1$ to $C_{10}$ hydrocarbyl radical. In an embodiment, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is a methyl radical, a fluoride, or a combination thereof.

In an embodiment, M is Zr; $X^1$ and $X^2$ are benzyl radicals; $R^1$ and $R^{14}$ are methyl radicals; $R^2$ through $R^{13}$ and $R^{15}$ through $R^{28}$ are hydrogen; and Y is ethylene (—CH$_2$CH$_2$—).

In an embodiment, M is Zr; $X^1$ and $X^2$ are benzyl radicals; $R^1$, $R^4$, $R^{14}$ and $R^{17}$ are methyl radicals; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In an embodiment, M is Zr; $X^1$ and $X^2$ are benzyl radicals; $R^1$ and $R^{14}$ are methyl radicals; $R^4$ and $R^{17}$ are fluoro (F) functional groups; $R^2$, $R^3$, $R^5$ through $R^{13}$, $R^{15}$, $R^{16}$ and $R^{18}$ through $R^{28}$ are hydrogen; and Y is ethylene —CH$_2$CH$_2$—).

In an embodiment, M is Zr; $X^1$ and $X^2$ are benzyl radicals; $R^1$, $R^4$, $R^{14}$, and $R^{17}$ are methyl radicals; $R^8$, $R^{11}$, $R^{21}$ and $R^{24}$ are tert-butyl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and Y is ethylene (—CH$_2$CH$_2$—).

In an embodiment, M is Zr; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are mesityl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and Y is ethylene (—CH$_2$CH$_2$—).

In an embodiment, the catalyst comprises Group 3, 4, 5 and/or 6 disubstituted compounds supported by a tetradentate di-anionic Salan ligand, useful to polymerize olefins and/or α-olefins to produce polyolefins and/or poly(α-olefins). In an embodiment, the catalyst compounds are represented by the following structure:

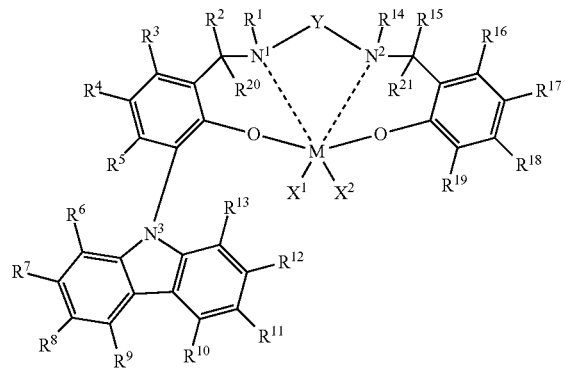

where each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is independently, a hydrogen, a $C_1$-$C_{40}$ hydrocarbyl, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof, subject to the proviso that $R^{19}$ is not a carbazole or a substituted carbazole radical; and Y is a divalent hydrocarbyl radical covalently bonded to and bridging between both of the nitrogen atoms $N^1$ and $N^2$. In an embodiment, two or more of $R^1$ to $R^{21}$ may independently join together to form a $C_4$ to $C_{62}$ cyclic or polycyclic ring structure.

Accordingly, the instant disclosure in one embodiment is directed to non-symmetrical Salan catalysts. The Salan catalysts disclosed herein are devoid of a symmetry element, having a non-symmetric or non-palindromic structure. By non-symmetric, it is meant that the two phenol moieties of the Salan compound are substituted differently when comparing the substitutions of one phenol, which comprises a carbazole or substituted carbazole radical, and the other phenol which does not comprise a carbazole or a substituted carbazole radical at position $R^{19}$ (i.e., subject to the proviso that $R^{19}$ is not a carbazole or a substituted carbazole radical), as is shown in the above structure.

In an embodiment, a catalyst compound is represented by the structure

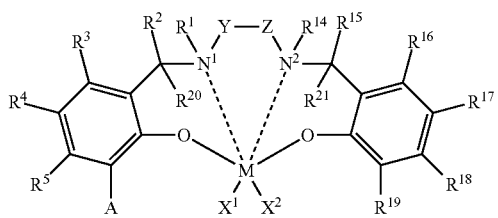

wherein A is represented by the structure attached at the carbazole nitrogen atom:

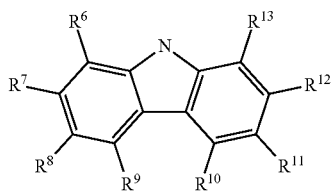

where each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is independently, a hydrogen, a $C_1$-$C_{40}$ hydrocarbyl, a functional group comprising elements from Group 13-17 of the periodic table of the elements, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may independently join together to form a $C_4$ to $C_{62}$ cyclic or polycyclic ring structure, or a combination thereof, subject to the proviso that $R^{19}$ is not identical to A; and Y and Z form a divalent hydrocarbyl radical covalently bonded to and bridging between both of the nitrogen atoms $N^1$ and $N^2$. In an embodiment, Y is identical to Z. In an embodiment, Y is different to Z. In an embodiment, two or more of $R^1$ to $R^{21}$ may independently join together to form a $C_4$ to $C_{62}$ cyclic or polycyclic ring structure.

In an embodiment, M is a Group 4 metal, or M is Hf, Ti and/or Zr, or M is Hf or Zr. In an embodiment, each of $X^1$ and $X^2$ is independently selected from the group consisting of hydrocarbyl radicals having from 1 to 20 carbon atoms, hydrides, amides, alkoxides having from 1 to 20 carbon atoms, sulfides, phosphides, halides, amines, phosphines, ethers, and combinations thereof.

In an embodiment, $X^1$ and $X^2$ together form a part of a fused ring or a ring system having from 4 to 62 carbon atoms.

In an embodiment, each of $X^1$ and $X^2$ is independently selected from the group consisting of halides, alkyl radicals having from 1 to 7 carbon atoms, benzyl radicals, or a combination thereof.

In an embodiment, Y is a divalent $C_1$-$C_{40}$ hydrocarbyl radical comprising a portion that comprises a linker backbone comprising from 1 to 18 carbon atoms linking or bridging between nitrogen atoms $N^1$ and $N^2$. In an embodiment, Y is a $C_1$-$C_{40}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R*), N or N(R*), wherein each R* is independently a $C_1$-$C_{18}$ hydrocarbyl. In an embodiment, Y is selected from the group consisting of ethylene (—CH$_2$CH$_2$—) and 1,2-cyclohexylene, and/or —CH$_2$CH$_2$CH$_2$— derived from propylene. In an embodiment, Y is —CH$_2$CH$_2$CH$_2$— derived from propylene.

In an embodiment, each X is, independently, a halogen or a $C_1$ to $C_7$ hydrocarbyl radical.

In an embodiment, each X is a benzyl radical. In an embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, hydrogen, a halogen, or a $C_1$ to $C_{30}$ hydrocarbyl radical, or a $C_1$ to $C_{10}$ hydrocarbyl radical, subject to the proviso that $R^{19}$ is not a carbazole or a substituted carbazole radical. In an embodiment, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$ and $R^{21}$ is a methyl radical, a bromine, an adamantyl radical, or a combination thereof.

In an embodiment, M is Zr; $X^1$ and $X^2$ are benzyl; $R^1$ and $R^{14}$ are methyl; $R^2$ through $R^{13}$, $R^{15}$, $R^{16}$, $R^{18}$, $R^{20}$ and $R^{21}$ are hydrogen; $R^{17}$ and $R^{19}$ are bromine; and Y is —CH$_2$CH$_2$—.

In an embodiment, M is Zr; $X^1$ and $X^2$ are benzyl; $R^1$, $R^{14}$ and $R^{17}$ are methyl; $R^2$ through $R^{13}$, $R^{15}$, $R^{16}$, $R^{18}$, $R^{20}$ and $R^{21}$ are hydrogen; $R^{19}$ is 1-adamantyl; and Y is —CH$_2$CH$_2$—.

In an embodiment, M is Hf; $X^1$ and $X^2$ are benzyl; $R^1$ and $R^{14}$ are methyl; $R^2$ through $R^{13}$, $R^{15}$, $R^{16}$, $R^{18}$, $R^{20}$ and $R^{21}$ are hydrogen; $R^{17}$ is methyl; $R^{19}$ is 1-adamantyl; and Y is —CH$_2$CH$_2$—.

In an embodiment, two or more different catalyst compounds are present in the catalyst system used herein. In an embodiment, two or more different catalyst compounds are present in the reaction zone where the process(es) described herein occur. When two transition metal compound based catalysts are used in one reactor as a mixed catalyst system, the two transition metal compounds are chosen such that the two are compatible. Compatible catalysts are those catalysts having similar kinetics of termination and insertion of monomer and comonomer(s) and/or do not detrimentally interact with each other. For purposes herein, the term "incompatible catalysts" refers to and means catalysts that satisfy one or more of the following:

1) those catalysts that when present together reduce the activity of at least one of the catalysts by greater than 50%;

2) those catalysts that under the same reactive conditions produce polymers such that one of the polymers has a molecular weight that is more than twice the molecular weight of the other polymer; and 3) those catalysts that differ in comonomer incorporation or reactivity ratio under the same conditions by more than about 30%. A simple screening method such as by $^1$H or $^{13}$C NMR, known to those of ordinary skill in the art, can be used to determine which transition metal compounds are compatible. In an embodiment, the catalyst systems use the same activator for the catalyst compounds. In an embodiment, two or more different activators, such as a non-coordinating anion activator and an alumoxane, can be used in combination. If one or more catalyst compounds contain an $X^1$ or $X^2$ ligand which is not a hydride, or a hydrocarbyl, then in an embodiment the alumoxane is contacted with the catalyst compounds prior to addition of the non-coordinating anion activator.

In an embodiment, when two transition metal compounds (pre-catalysts) are utilized, they may be used in any ratio. In an embodiment, a molar ratio of a first transition metal compound (A) to a second transition metal compound (B) will fall within the range of (A:B) 1:1000 to 1000:1, or 1:100 to 500:1, or 1:10 to 200:1, or 1:1 to 100:1, or 1:1 to 75:1, or 5:1 to 50:1. The particular ratio chosen will depend on the exact pre-catalysts chosen, the method of activation, and the end product desired. In an embodiment, when using two pre-catalysts, where both are activated with the same activator, useful mole percents, based upon the total moles of the pre-catalysts, are 10:90 to 0.1:99, or 25:75 to 99:1, or 50:50 to 99.5:0.5, or 50:50 to 99:1, or 75:25 to 99:1, or 90:10 to 99:1.

Methods to Prepare the Catalyst Compounds.

In embodiments the symmetric transition metal compounds may be prepared by two general synthetic routes. The parent salan ligands are prepared by a one-step Mannich reaction from the parent phenol (Reaction A) or by a two-step imine-condensation/alkylation procedure if the salicylaldehyde is used (Reaction B). The ligand is then converted into the metal dibenzyl catalyst precursor by reaction with the metal tetra-aryl starting material, e.g., tetrabenzyl, to yield the finished complex (Reaction C).

Reaction A:

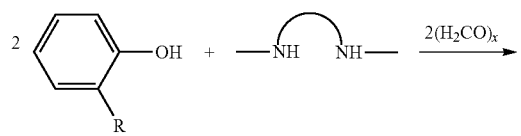

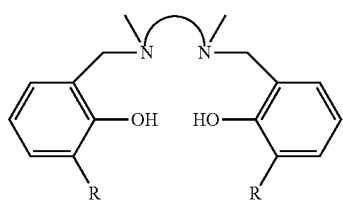

Reaction B:

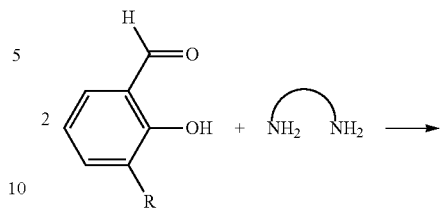

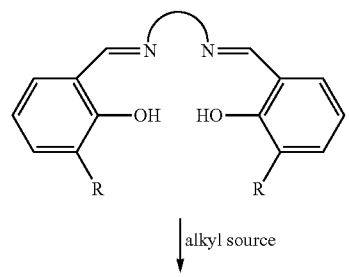

↓ alkyl source

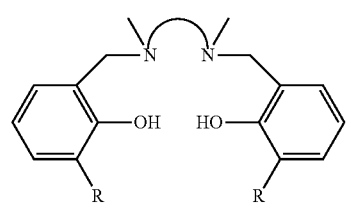

Reaction C:

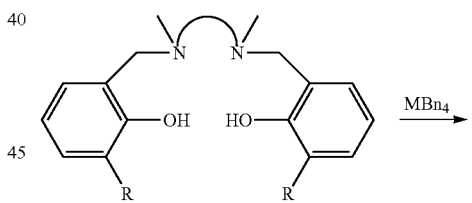

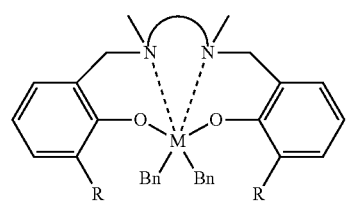

Asymmetric transition metal compounds may be prepared by a step-wise synthetic route. The parent salan ligands are prepared by reaction of the salicylaldehyde with the diamine, followed by reduction with NaBH$_4$. The asymmetric ligand is then formed by an HBr elimination reaction with a bromomethylphenol (Reaction D). The ligand is then converted into the metal dibenzyl catalyst precursor by reaction with the metal tetrabenzyl starting material to yield the finished complex (Reaction E).

Reaction D:

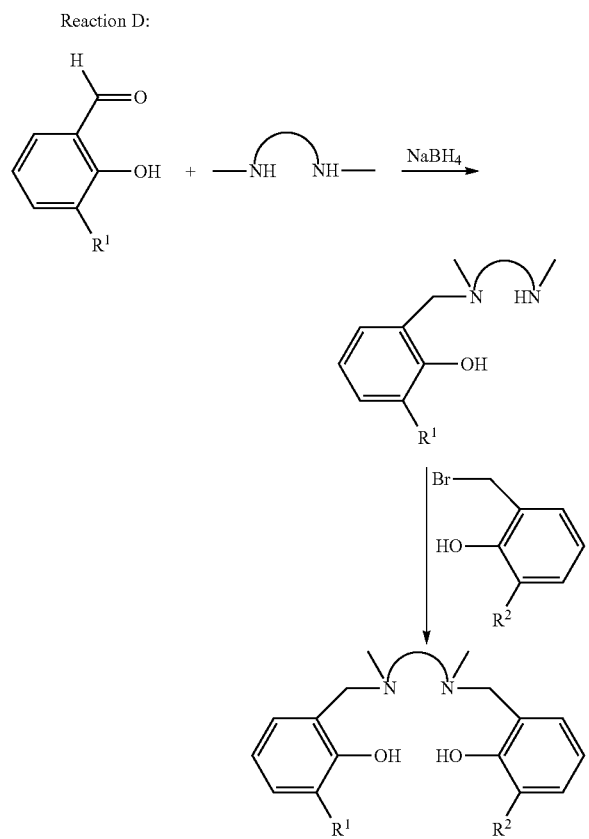

Reaction E:

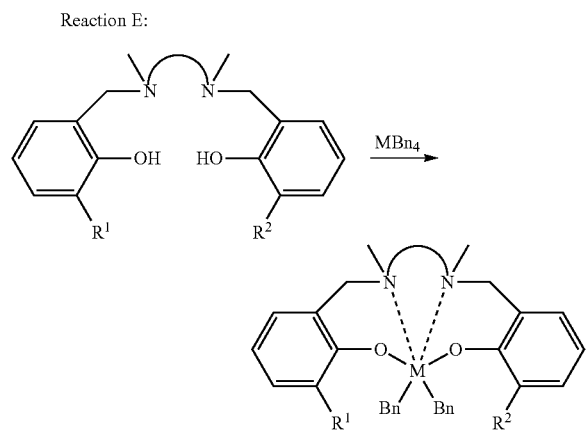

Activators

The terms "cocatalyst" and "activator" are used interchangeably to describe activators and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Activators may include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— subunits, where $R^1$ is an alkyl radical. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the catalyst precursor compound comprises an abstractable ligand which is an alkyl, halide, alkoxide or amide. Mixtures of different alumoxanes and modified alumoxanes may also be used. In an embodiment, visually clear methylalumoxane may be used. A cloudy or gelled alumoxane can be filtered to produce a clear solution or clear alumoxane can be decanted from the cloudy solution. A useful alumoxane is a modified methyl alumoxane (MMAO) described in U.S. Pat. No. 5,041,584 and/or commercially available from Akzo Chemicals, Inc. under the trade designation Modified Methylalumoxane type 3A. Solid alumoxanes may also be used.

When the activator is an alumoxane (modified or unmodified), in an embodiment, the maximum amount of activator is a 5000-fold molar excess Al/M over the catalyst compound (per metal catalytic site). In an embodiment, the minimum activator-to-catalyst-compound, which is determined according to molar concentration of the transition metal M, in an embodiments is 1 mole aluminum or less to mole of transition metal M. In an embodiment, the activator comprises alumoxane and the alumoxane is present at a ratio of 1 mole aluminum or more to mole of catalyst compound. In an embodiment, the minimum activator-to-catalyst-compound molar ratio is a 1:1 molar ratio. Other embodiments of Al:M ranges include from 1:1 to 500:1, or from 1:1 to 200:1, or from 1:1 to 100:1, or from 1:1 to 50:1.

In an embodiment, little or no alumoxane (i.e., less than 0.001 wt %) is used in the polymerization processes described herein. In an embodiment, alumoxane is present at 0.00 mole %, or the alumoxane is present at a molar ratio of aluminum to catalyst compound transition metal less than 500:1, or less than 300:1, or less than 100:1, or less than 1:1.

The term "non-coordinating anion" (NCA) refers to an anion which either does not coordinate to a cation, or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible with the polymerization or catalyst system, stabilize the transition metal cation in the sense of balancing its ionic charge at +1, and yet are sufficiently labile to permit displacement during polymerization.

In an embodiment, an ionizing or stoichiometric activator may be used, which may be neutral or ionic, such as tri(n-butyl) ammonium boron metalloid precursor, polyhalogenated heteroborane anions (WO 98/43983), boric acid (U.S. Pat. No. 5,942,459), or a combination thereof. In an embodiment, neutral or ionic activators alone or in combination with alumoxane or modified alumoxane activators may be used.

Examples of neutral stoichiometric activators include tri-substituted boron, tellurium, aluminum, gallium, and indium, or mixtures thereof. The three substituent groups or radicals can be the same or different and in an embodiment are each independently selected from substituted or unsubstituted alkyls, alkenyls, alkyns, aryls, alkoxy, and halogens. In an embodiment, the three groups are independently selected from halogen, mono or multicyclic (including halosubstituted) aryls, alkyls, and alkenyl compounds, and mixtures thereof; or independently selected from alkenyl radicals having 1 to 20 carbon atoms, alkyl radicals having 1 to 20 carbon atoms, alkoxy radicals having 1 to 20 carbon atoms and aryl or substituted aryl radicals having 3 to 20 carbon atoms. In an embodiment, the three substituent groups are alkyl radicals having 1 to 20 carbon atoms, phenyl, naphthyl, or mixtures thereof. In an embodiment, the three groups are halogenated aryl groups, e.g., fluorinated aryl groups. In an embodiment the neutral stoichiometric activator is tris perfluorophenyl boron or tris perfluoronaphthyl boron.

In an embodiment, ionic stoichiometric activator compounds may include an active proton, or some other cation associated with, but not coordinated to, or only loosely coordinated to the remaining ion of the ionizing compound. Suitable examples include compounds and the like described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and WO 1996/04319; all of which are herein fully incorporated by reference.

In an embodiment compounds useful as an activator comprise a cation, which is, for example, a Bronsted acid capable of donating a proton, and a compatible non-coordinating anion which anion is relatively large (bulky), capable of stabilizing the active catalyst species (the Group 4 cation, e.g.) which is formed when the two compounds are combined and said anion will be sufficiently labile to be displaced by olefinic, diolefinic or acetylenically unsaturated substrates or other neutral Lewis bases, such as ethers, amines, and the like. Two classes of useful compatible non-coordinating anions are disclosed in EP 0 277,003 A1, and EP 0 277,004 A1, which include anionic coordination complexes comprising a plurality of lipophilic radicals covalently coordinated to and shielding a central charge-bearing metal or metalloid core; and anions comprising a plurality of boron atoms such as carboranes, metallacarboranes, and boranes.

In an embodiment, the stoichiometric activators include a cation and an anion component, and may be represented by the following formula (1):

$$(Z)_d^+(A^{d-}) \quad (1)$$

wherein Z is (L-H) or a reducible Lewis Acid, L is a neutral Lewis base; H is hydrogen; (L-H)$^+$ is a Bronsted acid; A$^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the catalyst precursor, resulting in a cationic transition metal species, or the activating cation (L-H)$_d^+$ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it may be represented by the formula: (Ar$_3$C$^+$), where Ar is aryl or aryl substituted with a heteroatom, or a C$_1$ to C$_{40}$ hydrocarbyl, the reducible Lewis acid may be represented by the formula: (Ph$_3$C$^+$), where Ph is phenyl or phenyl substituted with a heteroatom, and/or a C$_1$ to C$_{40}$ hydrocarbyl. In an embodiment, the reducible Lewis acid is triphenyl carbenium.

Embodiments of the anion component A$^{d-}$ include those having the formula [M$^{k+}$Q$_n$]$^{d-}$ wherein k is 1, 2, or 3; n is 1, 2, 3, 4, 5 or 6, or 3, 4, 5 or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable A$^{d-}$ components also include diboron compounds as disclosed in U.S. Pat. No. 5,447,895, which is fully incorporated herein by reference.

In an embodiment, this invention relates to a method to polymerize olefins comprising contacting olefins (e.g., ethylene) with a Salan catalyst compound, a chain transfer agent (CTA) and a boron containing NCA activator represented by the formula (1) where: Z is (L-H) or a reducible Lewis acid; L is an neutral Lewis base (as further described above); H is hydrogen; (L-H) is a Bronsted acid (as further described above); A$^{d-}$ is a boron containing non-coordinating anion having the charge d$^-$ (as further described above); d is 1, 2, or 3.

In an embodiment in any of the NCA's represented by Formula 1 described above, the anion component A$^{d-}$ is represented by the formula [M*$^{k*}$+Q*$_{n*}$]$^{d*-}$ wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

This invention also relates to a method to polymerize olefins comprising contacting olefins (such as ethylene) with a Salan catalyst compound as described above, optionally with a CTA and an NCA activator represented by the Formula (2):

$$R_nM^{**}(ArNHal)_{4-n} \quad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is Z$_d^+$ as described above.

In an embodiment in any of the NCA's comprising an anion represented by Formula 2 described above, R is selected from the group consisting of C$_1$ to C$_{30}$ hydrocarbyl radicals. In an embodiment, C$_1$ to C$_{30}$ hydrocarbyl radicals may be substituted with one or more C$_1$ to C$_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C$_4$ to C$_{20}$ hydrocarbyl radicals; —SR$^1$, —NR$^2_2$, and —PR$^3_2$, where each R$^1$, $R^2$, or $R^3$ is independently a $C_1$ to $C_{30}$ hydrocarbyl as defined above; or a $C_1$ to $C_{30}$ hydrocarbyl substituted organometalloid.

In an embodiment in any of the NCA's comprising an anion represented by Formula 2 described above, the NCA also comprises cation comprising a reducible Lewis acid represented by the formula: $(Ar_3C^+)$, where Ar is aryl or aryl substituted with a heteroatom, and/or a $C_1$ to $C_{40}$ hydrocarbyl, or the reducible Lewis acid represented by the formula: $(Ph_3C^+)$, where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, $(L-H)_d^+$, wherein L is an neutral Lewis base; H is hydrogen; (L-H) is a Bronsted acid; and d is 1, 2, or 3, or $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \quad (3)$$

wherein $OX^{e+}$ is a cationic oxidizing agent having a charge of e+; e is 1, 2, or 3; d is 1, 2 or 3; and $A^{d-}$ is a non-coordinating anion having the charge of d– (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

In an embodiment, the Salan catalyst compounds, CTA's, and/or NCA's described herein can be used with bulky activators. A "bulky activator" as used herein refers to anionic activators represented by the formula:

where each $R_1$ is, independently, a halide, or a fluoride;
each $R_2$ is, independently, a halide, a $C_6$ to $C_{20}$ substituted aromatic hydrocarbyl radical or a siloxy group of the formula —O—Si—$R_a$, where $R_a$ is a $C_1$ to $C_{20}$ hydrocarbyl or hydrocarbylsilyl radical (or $R_2$ is a fluoride or a perfluorinated phenyl radical);
each $R_3$ is a halide, $C_6$ to $C_{20}$ substituted aromatic hydrocarbyl radical or a siloxy group of the formula —O—Si—$R_a$, where $R_a$ is a $C_1$ to $C_{20}$ hydrocarbyl radical or hydrocarbylsilyl group (or $R_3$ is a fluoride or a $C_6$ perfluorinated aromatic hydrocarbyl radical); wherein $R_2$ and $R_3$ can form one or more saturated or unsaturated, substituted or unsubstituted rings (or $R_2$ and $R_3$ form a perfluorinated phenyl ring);
L is an neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, or greater than 300 cubic Å, or greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | MV Per subst. (Å³) | Total MV (Å³) |
| --- | --- | --- | --- | --- |
| Dimethylanilinium tetrakis(perfluoronaphthyl)borate | 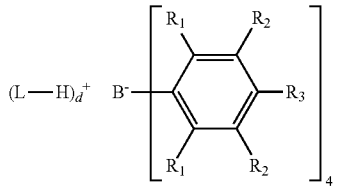 | $C_{10}F_7$ | 261 | 1044 |

-continued

| Activator | Structure of boron substituents | Molecular Formula of each substituent | MV Per subst. (Å³) | Total MV (Å³) |
|---|---|---|---|---|
| Dimethylanilinium tetrakis(perfluorobiphenyl)borate | [structure] | $C_{12}F_9$ | 349 | 1396 |
| [4-tButyl-PhNMe$_2$H] [(C$_6$F$_3$(C$_6$F$_5$)$_2$)$_4$B] | [structure] | $C_{18}F_{13}$ | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-tert-butyl-PhNMe$_2$H][(C$_6$F$_3$(C$_6$F$_5$)$_2$)$_4$B], and the types disclosed in U.S. Pat. No. 7,297,653, which is fully incorporated by reference herein.

Illustrative, but not limiting, examples of boron compounds which may be used as an activator in the processes according to the instant disclosure include: trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate, triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6- tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Suitable activators include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^{31}\ ]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In an embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In an embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium)tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium)tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or tert-butyl).

In an embodiment, any of the activators described herein may be mixed together before or after combination with the catalyst compound and/or CTA and/or NCA, or before being mixed with the catalyst compound and/or CTA, and/or NCA.

In an embodiment two NCA activators may be used in the polymerization and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

In an embodiment, the NCA activator-to-catalyst ratio is a 1:1 molar ratio, or 0.1:1 to 100:1, or 0.5:1 to 200:1, or 1:1 to 500:1 or 1:1 to 1000:1. In an embodiment, the NCA activator-to-catalyst ratio is 0.5:1 to 10:1, or 1:1 to 5:1.

In an embodiment, the catalyst compounds can be combined with combinations of alumoxanes and NCA's (see for example, U.S. Pat. No. 5,153,157, U.S. Pat. No. 5,453,410, EP 0 573 120 B1, WO 94/07928, and WO 95/14044 which discuss the use of an alumoxane in combination with an ionizing activator, all of which are incorporated by reference herein).

Scavengers or Co-Activators

In an embodiment the catalyst system may further include scavengers and/or co-activators. Suitable aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used. In an embodiment, the scavengers and/or co-activators are present at less than 14 wt %, or from 0.1 to 10 wt %, or from 0.5 to 7 wt %, by weight of the catalyst system.

Catalyst Supports

In an embodiment, the catalyst system may comprise an inert support material. In an embodiment, the support material comprises a porous support material, for example, talc, and/or inorganic oxides. Other suitable support materials include zeolites, clays, organoclays, or any other organic or inorganic support material and the like, or mixtures thereof.

In an embodiment, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, and/or alumina include magnesia, titania, zirconia, montmorillonite, phyllosilicate, and/or the like. Other suitable support materials include finely divided functionalized polyolefins, such as finely divided polyethylene.

In an embodiment, the support material may have a surface area in the range of from about 10 to about 700 m$^2$/g, pore volume in the range of from about 0.1 to about 4.0 cc/g and average particle size in the range of from about 5 to about 500 µm, or the surface area of the support material is in the range of from about 50 to about 500 m$^2$/g, pore volume of from about 0.5 to about 3.5 cc/g and average particle size of from about 10 to about 200 µm. In an embodiment, a majority portion of the surface area of the support material is in the range is from about 100 to about 400 m$^2$/g, pore volume from about 0.8 to about 3.0 cc/g and average particle size is from about 5 to about 100 µm. In an embodiment, the average pore size of the support material is in the range of from 10 to 1000 Å, or 50 to about 500 Å, or 75 to about 350 Å. In an embodiment, the support material is a high surface area, amorphous silica having a surface area greater than or equal to about 300 m$^2$/gm, and/or a pore volume of 1.65 cm$^3$/gm. Suitable silicas are marketed under the tradenames of Davison 952 or Davison 955 by the Davison Chemical Division of W.R. Grace and Company. In an embodiment the support may comprise Davison 948.

In an embodiment, the support material should be essentially dry, that is, essentially free of absorbed water. Drying of the support material can be effected by heating or calcining at about 100° C. to about 1000° C., or at a temperature of at least about 400° C., or 500° C., or 600° C. When the support material is silica, it is heated to at least 200° C., or about 200° C. to about 850° C., or at least 600° C. for a time of about 1 minute to about 100 hours, or from about 12 hours to about 72 hours, or from about 24 hours to about 60 hours. In an embodiment, the calcined support material must have at least some reactive hydroxyl (OH) groups to produce supported catalyst systems according to the instant disclosure.

In an embodiment, the calcined support material is contacted with at least one polymerization catalyst comprising at least one catalyst compound and an activator. In an embodiment, the support material, having reactive surface groups, typically hydroxyl groups, is slurried in a non-polar solvent and the resulting slurry is contacted with a solution of a catalyst compound and an activator. In an embodiment, the slurry of the support material is first contacted with the activator for a period of time in the range of from about 0.5 hours to about 24 hours, or from about 2 hours to about 16 hours, or from about 4 hours to about 8 hours. The solution of the catalyst compound is then contacted with the isolated support/activator. In an embodiment, the supported catalyst system is generated in situ. In an alternate embodiment, the slurry of the support material is first contacted with the catalyst compound for a period of time in the range of from about 0.5 hours to about 24 hours, or from about 2 hours to about 16 hours, or from about 4 hours to about 8 hours. The slurry of the supported catalyst compound is then contacted with the activator solution.

In an embodiment, the mixture of the catalyst, activator and support is heated to about 0° C. to about 70° C., or to about 23° C. to about 60° C., or to room temperature. Contact times typically range from about 0.5 hours to about 24 hours, or from about 2 hours to about 16 hours, or from about 4 hours to about 8 hours.

Suitable non-polar solvents are materials in which all of the reactants used herein, i.e., the activator and the catalyst compound are at least partially soluble and which are liquid at reaction temperatures. Suitable non-polar solvents include alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In an embodiment, a polymerization processes includes contacting monomers (such as ethylene and propylene), and optionally comonomers, with a catalyst system comprising an activator and at least one catalyst compound, as described above. In an embodiment, the catalyst compound and activator may be combined in any order, and may be combined prior to contacting with the monomer. In an embodiment, the catalyst compound and/or the activator are combined after contacting with the monomer.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment of the invention, the monomer comprises propylene and an optional comonomers comprising one or more ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In an embodiment, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In an embodiment one or more dienes are present in the polymer produced herein at up to 10 weight %, or at 0.00001 to 1.0 weight %, or 0.002 to 0.5 weight %, or 0.003 to 0.2 weight %, based upon the total weight of the composition. In an embodiment 500 ppm or less of diene is added to the polymerization, or 400 ppm or less, or 300 ppm or less. In an embodiment at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment, the diolefin monomers may be selected from alpha, omega-diene monomers (i.e. di-vinyl monomers). Moreover, the diolefin monomers are linear di-vinyl monomers, most or those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In an embodiment, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes according to the instant disclosure may be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are suitable for use herein, wherein a homogeneous polymerization process is defined to be a process where at least 90 wt % of the product is soluble in the reaction media. A bulk homogeneous process is suitable for use herein, wherein a bulk process is defined to be a process where monomer concentration in all feeds to the reactor is 70 volume % or more. In an embodiment, no solvent or diluent is present or added in the reaction medium, (except for the small amounts used as the carrier for the catalyst system or other additives, or amounts typically found with the monomer; e.g., propane in propylene). In an embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment, the solvent is not aromatic, or aromatics are present in the solvent at less than 1 wt %, or less than 0.5 wt %, or less than 0.0 wt % based upon the weight of the solvents.

In an embodiment, the feed concentration of the monomers and comonomers for the polymerization is 60 vol % solvent or less, or 40 vol % or less, or 20 vol % or less, based on the total volume of the feedstream. Or the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., or about 20° C. to about 200° C., or about 35° C. to about 150° C., or about 50° C. to about 150° C., or from about 40° C. to about 120° C., or from about 45° C. to about 80° C.; and at a pressure in the range of from about 0.35 MPa to about 10 MPa, or from about 0.45 MPa to about 6 MPa, or from about 0.5 MPa to about 4 MPa.

In an embodiment, the run time of the reaction is from about 0.1 minutes to about 24 hours, or up to 16 hours, or in the range of from about 5 to 250 minutes, or from about 10 to 120 minutes.

In an embodiment, hydrogen is present in the polymerization reactor at a partial pressure of 0.001 to 50 psig (0.007 to 345 kPa), or from 0.01 to 25 psig (0.07 to 172 kPa), or 0.1 to 10 psig (0.7 to 70 kPa).

In an embodiment, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment, the polymerization conditions include one or more of the following: 1) temperatures of 0 to 300° C. (or 25 to 150° C., or 40 to 120° C., or 45 to 80° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; or where aromatics are or present in the solvent at less than 1 wt %, or less than 0.5 wt %, or at 0 wt % based upon the weight of the solvents); 4) wherein the catalyst system used in the polymerization comprises less than 0.5 mol %, or 0 mol % alumoxane, or the alumoxane is present at a molar ratio of aluminum to transition metal less than 500:1, or less than 300:1, or less than 100:1, or less than 1:1; 5) the polymerization or occurs in one reaction zone; 6) the productivity of the catalyst compound is at least 80,000 g/mmol/hr (or at least 150,000 g/mmol/hr, or at least 200,000 g/mmol/hr, or at least 250,000 g/mmol/hr, or at least 300,000 g/mmol/hr); 7) scavengers (such as trialkyl aluminum compounds) are absent (e.g., present at zero mol %) or the scavenger is present at a molar ratio of scavenger to transition metal of less than 100:1, or less than 50:1, or less than 15:1, or less than 10:1; and/or 8) optionally hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone.

Polyolefin Products

The instant disclosure also relates to compositions of matter produced by the methods described herein.

In an embodiment, the process described herein produces propylene homopolymers or propylene copolymers, such as propylene-ethylene and/or propylene-α-olefin (or $C_3$ to $C_{20}$) copolymers (such as propylene-hexene copolymers or propylene-octene copolymers) having a Mw/Mn of greater than 1 to 4 (or greater than 1 to 3).

Likewise, the process of this invention produces olefin polymers, or polyethylene and polypropylene homopolymers and copolymers. In an embodiment, the polymers produced herein are homopolymers of ethylene or propylene, are copolymers of ethylene or having from 0 to 25 mole % (or from 0.5 to 20 mole %, or from 1 to 15 mole %, or from 3 to 10 mole %) of one or more $C_3$ to $C_{20}$ olefin comonomer (or $C_3$ to $C_{12}$ alpha-olefin, or propylene, butene, hexene, octene, decene, dodecene, or propylene, butene, hexene, octene), or are copolymers of propylene or having from 0 to 25 mole % (or from 0.5 to 20 mole %, or from 1 to 15 mole %, or from 3 to 10 mole %) of one or more of $C_2$ or $C_4$ to $C_{20}$ olefin comonomer (or ethylene or $C_4$ to $C_{12}$ alpha-olefin, or ethylene, butene, hexene, octene, decene, dodecene, or ethylene, butene, hexene, octene).

In an embodiment, the monomer is ethylene and the comonomer is hexene, or from 1 to 15 mole % hexene, or 1 to 10 mole % hexene.

In an embodiment, the polymers produced herein have an Mw of 5,000 to 1,000,000 g/mol (e.g., 25,000 to 750,000 g/mol, or 50,000 to 500,000 g/mol), and/or an Mw/Mn of greater than 1 to 40, or 1.2 to 20, or 1.3 to 10, or 1.4 to 5, or 1.5 to 4, or 1.5 to 3.

In an embodiment, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated Mw, Mn, MWD are determined by GPC as described in US 2006/0173123 page 24-25, paragraphs [0334] to [0341].

In an embodiment, the polymers may be linear in character, which may be determined by elution fractionation, wherein non-linear polymers have a CDBI of less than 45%, whereas linear polyethylene types refer to polyethylene having a CDBI of greater than 50%, the CDBI being determined as described in WO93/03093 (U.S. Pat. No. 5,206,075). In an embodiment the polymer produced herein has a composition distribution breadth index (CDBI) of 50% or more, or 60% or more, or 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Polymers with an Mw/Mn of 4.5 or less may include a significant level of long chain branching. The long chain branching is understood to be the result of the incorporation of terminally unsaturated polymer chains (formed by the specific termination reaction mechanism encountered with single site catalysts) into other polymer chains in a manner analogous to monomer incorporation. The branches are hence believed to be linear in structure and may be present at a level where no peaks can be specifically attributed to such long chain branches in the $^{13}C$ NMR spectrum. In an embodiment, the polymers produced according to the instant disclosure comprise a significant amount of long chain branching, defined as having a ratio of long chain branching of at least 7 carbons per 1000 carbon atoms as determined according to the $^{13}C$ NMR spectrum of greater than 0.5. I an embodiment, the ratio of long chain branching with branches having at least 7 carbons, per 1000 carbon atoms as determined according to the $^{13}C$ NMR spectrum is greater than 1, or greater than 1.5, or greater than 2.

In an embodiment, the polymers produced according to the instant disclosure include a significant amount of vinyl termination, defined as a ratio of vinyl groups per molecule of greater than or equal to 0.2. In an embodiment, the polymers according to the instant disclosure comprise a ratio of vinyl groups per molecule of greater than or equal to 0.5, or 0.7, or 0.8, or 0.9, or 0.95, when determined according to the description provided in the J. American Chemical Soc., 114, 1992, pp. 1025-1032, or an equivalent thereof.

This invention relates to ethylene polymers having both vinyl termination and long chain branching, which in an embodiment are produced by the processes and using the catalyst disclosed herein. In an embodiment, the process described herein produces ethylene homopolymers or ethylene copolymers, such as ethylene-alpha-olefin (preferably $C_3$ to $C_{20}$) copolymers (such as ethylene-propylene copolymers, ethylene-hexene copolymers or ethylene-octene copolymers) having:

a) at least 50% allyl chain ends, or least 60%, 70%, 80%, 90%, 95%, 98%, or 99%; and/or b) an Mn of at least 200 g/mol, measured by $^1H$ NMR, or 250 g/mol to 100,000 g/mol, e.g., or 200 g/mol to 75,000 g/mol, e.g., or 200 g/mol to 60,000 g/mol, or 300 g/mol to 60,000 g/mol, or 750 g/mol to 30,000 g/mol); and/or c) at least 0.5 branches having 7 or more carbon atoms per 1000 carbon atoms, or 1.0 or more, or 1.25 or more, or 1.5 or more, or 1.75 or more, or 2.0 or more, or from 0.5 to 5.0, or from 1.0 to 4.0, or from 1.5 to 3.0; and/or d) a Tm of 100° C. or more, or 110° C. or more, or 120° C. or more; and/or e) a ratio of methyl chain ends, also referred to herein as saturated chain ends, to allyl chain ends of 1:1 to 5:1, or 1:1 to 4:1, or 1:1 to 3:1; and/or f) at least 50 wt % of the polymer, which may be an ethylene homopolymer or copolymer, has one vinyl per molecule or per chain as determined by $^1H$ NMR, or at least 60 wt %, or at least 70 wt %, or at least 80 wt %, or at least 90 wt %, or at least 95 wt %; and/or essentially no diene is present, or the polymer comprises less than or equal to about 0.01 wt % diene; and/or g) the polymer comprises at least 50 mol % ethylene, or at least 60 mol %, or at least 70 mol %, or at least 75 mol %, or at least 80 mol %, or at least 85 mol %, or at least 90 mol %, or at least 95 mol %, or essentially 100 mol % ethylene; and/or h) an Mw/Mn of greater than 1 to 4, or greater than 1 to 3.

In an embodiment, polymer produced herein has less than 1400 ppm aluminum, or less than 1200 ppm, or less than 1000 ppm, or less than 500 ppm, or less than 100 ppm as determined by ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth- Heinemann, Boston, Mass., 1992, pp. 633-644, which is used herein for purposes of determining the amount of an element in a material; and/or in an embodiment, the polymer has less than 1400 ppm of the Group 3, 4, 5, or 6 transition metal, or of the Group 4 transition metal, or of Ti, Zr, and/or Hf, or less than 1200 ppm, or less than 1000 ppm, or less than 500 ppm, or less than 100 ppm, as determined by ICPES as discussed above.

In an embodiment of the invention, an ethylene polymer according to the instant disclosure has less than 1400 ppm hafnium, or less than 1200 ppm, or less than 1000 ppm, or less than 500 ppm, or less than 100 ppm as determined by ICPES.

In an embodiment of the invention, an ethylene polymer according to the instant disclosure has less than 1400 ppm zirconium, or less than 1200 ppm, or less than 1000 ppm, or less than 500 ppm, or less than 100 ppm as determined by ICPES.

In an embodiment, the polymer produced herein, which may be an ethylene polymer, has a density of greater than 0.95 g/cc, or greater than 0.955 g/cc, or greater than 0.96 g/cc.

In an embodiment, the ethylene polymer produced herein has a branching index (g'vis) of 0.9 or less, or 0.85 or less, or 0.80 or less, where g'vis is determined as described below.

For purposes herein, Mw, Mz number of carbon atoms, g value and $g'_{vis}$ are determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B LS columns are used. The nominal flow rate is 0.5 cm$^3$/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 14 5° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromotographic slices, i, between the integration limits. The branching index $g'_{vis}$ is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis.

The parameter "g" also called a "g value" is defined to be $Rg^2_{pm}/Rg^2_{ls}$, where $Rg_{pm}$ is the radius of gyration for the polymacromer, $Rg^2_{ls}$ is the radius of gyration for the linear standard, and $Rg_{ls}=K_sM^{0.58}$ where $K_s$ is the power law coefficient (0.023 for linear polyethylene, 0.0171 for linear polypropylene, and 0.0145 for linear polybutene), and M is the molecular weight as described above, $Rg_{pm}=K_TM^{\alpha_s}$. $\alpha_s$ is the size coefficient for the polymacromer, $K_T$ is the power law coefficient for the polymacromer. See Macromolecules, 2001, 34, 6812-6820, for guidance on selecting a linear standards having the molecular weight and comonomer content, and determining K coefficients and α exponents.

$^{13}$C NMR data was collected at 120° C. in a 10 mm probe using a Varian spectrometer with a $^1$Hydrogen frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest. Samples were dissolved in tetrachloroethane-d$_2$ at concentrations between 10 to 15 wt % prior to being inserted into the spectrometer magnet. Prior to data analysis spectra were referenced by setting the chemical shift of the (—CH$_2$—)$_n$ signal where n>6 to 29.9 ppm. Chain ends for quantization were identified using the signals shown in the table below. N-butyl and n-propyl were not reported due to their low abundance (less than 5%) relative to the chain ends shown in the table below.

| Chain End | $^{13}$CNMR Chemical Shift |
|-----------|----------------------------|
| P~i-Bu    | 23-5 to 25.5 and 25.8 to 26.3 ppm |
| E~i-Bu    | 39.5 to 40.2 ppm           |
| P~Vinyl   | 41.5 to 43 ppm             |
| E~Vinyl   | 33.9 to 34.4 ppm           |

Samples are dissolved in d$_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

The "allyl chain end to vinylidene chain end ratio" is defined to be the ratio of the percentage of allyl chain ends to the percentage of vinylidene chain ends.

The "allyl chain end to vinylene chain end ratio" is defined to be the ratio of the percentage of allyl chain ends to the percentage of vinylene chain ends.

The term "allyl chain end" (also referred to as "allylic vinyl group" or "allylic vinyl end group") is defined to be a polymer having at least one terminus represented by (CH$_2$=CH—CH$_2$-polymer) according to the following formula:

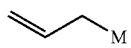

where M represents the polymer chain.

The term "vinylidene chain end" is defined to be a polymer having at least one terminus represented by (CH$_3$—C(=CH$_2$)—CH$_2$-polymer).

The term "vinylene chain end" is defined to be a polymer having at least one terminus represented by (CH$_3$—CH=CH—CH$_2$-polymer).

In an embodiment, the amount of allyl chain ends is determined using $^1$H NMR at 120° C. using deuterated tetrachloroethane as the solvent on a 500 MHz machine and in selected cases confirmed by $^{13}$C NMR. Literature values have been reported for proton and carbon assignments where neat perdeuterated tetrachloroethane is used for proton spectra and a 50:50 mixture of normal and perdeuterated tetrachloroethane is used for carbon spectra; all spectra are recorded at 100° C. on a BRUKER AM 300 spectrometer operating at 300 MHz for proton and 75.43 MHz for carbon, for vinyl terminated propylene oligomers, as in *J. American Chemical Soc.*, 114, 1992, pp. 1025-1032.

Vinyl terminated polymers typically also have a saturated chain end, also referred to as a methyl end. In polymerizations comprising C$_4$ or greater monomers (or "higher olefin" monomers), the saturated chain end may be a C$_4$ or greater (or "higher olefin") chain end, as shown in the formula below:

higher olefin chain end where M represents the polymer chain and n is an integer selected from 4 to 40. This is especially true when there is substantially no ethylene or propylene in the polymerization. In an ethylene/(C$_4$ or greater monomer) copolymerization, the polymer chain may initiate growth in an ethylene monomer, thereby generating a saturated chain end which is an ethyl chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

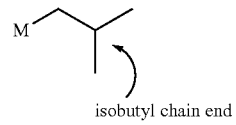

isobutyl chain end where M represents the polymer chain. Isobutyl chain ends are determined according to the procedure set out in WO 2009/155471.

Mn ($^1$H NMR) is determined according to the following NMR method. $^1$H NMR data is collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons are calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

Differential Scanning Calorimetry (DSC)

Crystallization temperature ($T_c$), melting temperature (or melting point, $T_m$), glass transition temperature ($T_g$) and heat of fusion ($H_f$) are measured using Differential Scanning calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history. Then the sample is cooled from the melt to at least 50° C. below the crystallization temperature, typically –100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Heat of melting (Hm) is determined using the DSC procedure above except that the sample is cooled to –100° C., held for 5 minutes then heated at 10° C./min to 200° C. Hm is measured on the first melt, no the second melt. The Hm sample must have been aged at least 48 hours at room temperature and should not be heated to destroy thermal history.

Ethylene Content

Ethylene content in ethylene copolymers is determined by ASTM D 5017-96, except that the minimum signal-to-noise should be 10,000:1. Propylene content in propylene copolymers is determined by following the approach of Method 1 in Di Martino and Kelchermans, *J. Appl. Polym. Sci.* 56, 1781 (1995), and using peak assignments from Zhang, *Polymer* 45, 2651 (2004) for higher olefin comonomers.

Mn, Mw, and Mz may also be measured by using a Gel Permeation Chromatography (GPC) method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, *Macromolecules*, Volume 34, Number 19, pp. 6812-6820, (2001) and references therein. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DPI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and ethylene polymers, and 0.1 otherwise. Units of parameters used throughout this description of the SEC method are: concentration is expressed in g/cm$^3$, molecular weight is expressed in g/mol, and intrinsic viscosity is expressed in dL/g.

Blends

In an embodiment, the polymer (or the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, polyesters, polyacetal, polyvinylidine fluoride, polyethylene glycols, and/or polyisobutylene.

In an embodiment, the polymer (or the polyethylene or polypropylene) is present in the above blends, at from 10 to 99 wt %, based upon the weight of the polymers in the blend, or 20 to 95 wt %, or at least 30 to 90 wt %, or at least 40 to 90 wt %, or at least 50 to 90 wt %, or at least 60 to 90 wt %, or at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

In an embodiment, any of the foregoing polymers, such as the foregoing polypropylenes or blends thereof, may be used in a variety of end-use applications. Applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the machine direction (MD) at a ratio of up to 15, or between 5 and 7, and in the transverse direction (TD) at a ratio of up to 15, or 7 to 9. However, In an embodiment the film is oriented to the same extent in both the MD and TD directions.

The films may vary in thickness depending on the intended application; however, films of a thickness from 1 to 50 µm are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

In an embodiment, one or more layers may be modified by corona treatment, electron beam irradiation, gamma irradiation, flame treatment, or microwave. In an embodiment, one or both of the surface layers is modified by corona treatment.

Molded Products

The compositions described herein (or polypropylene compositions) may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein (or polypropylene compositions) may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile coextrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 µm to 2540 µm (10 mils to 100 mils), although any given sheet may be substantially thicker.

Non-Wovens and Fibers

The polyolefin compositions described above may also be used to prepare nonwoven fabrics and fibers of this invention in any nonwoven fabric and fiber making process, including but not limited to, melt blowing, spunbonding, film aperturing, and staple fiber carding. A continuous filament process may also be used. Or a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

EMBODIMENTS

Accordingly, the instant disclosure relates to the following embodiments:

A. A process comprising:
   contacting one or more olefins with a catalyst system at a temperature, a pressure, and for a period of time sufficient to produce a polyolefin comprising
   a) at least 50% allyl chain ends; and
   b) an Mn of at least 200 g/mol, as determined by $^1$H NMR;
   the catalyst system comprising an activator and a catalyst compound according to Formula I, Formula II, or a combination thereof:
   Formula I being represented by:

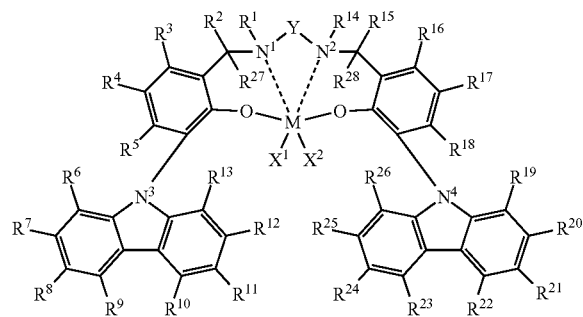

wherein M is a Group 3, 4, 5 or 6 transition metal;
   each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
   each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof; and
   Y is a divalent $C_1$ to $C_{20}$ hydrocarbyl;
   Formula II being represented by:

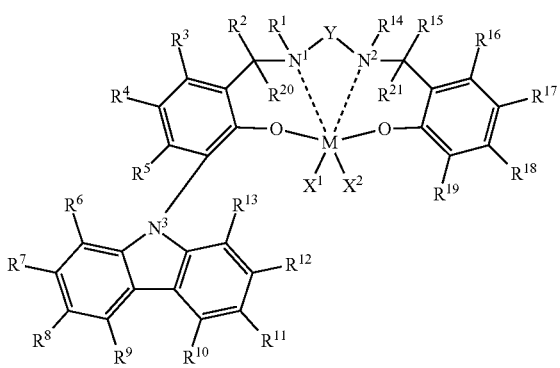

wherein M is a Group 3, 4, 5 or 6 transition metal;
   each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
   each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
   Y is a divalent $C_1$ to $C_{20}$ hydrocarbyl radical.

B. The process according to embodiment A, wherein two or more of $R^1$ to $R^{28}$ of Formula I, $R^1$ to $R^{21}$ of Formula II, or a both, independently join together to form a $C_4$ to $C_{62}$ cyclic or polycyclic ring structure.

C. The process according to any one of embodiments A-B, wherein M of Formula I, Formula II, or both is Hf, Ti, or Zr.

D. The process according to any one of embodiments A-C, wherein each X of Formula I, Formula II, or both is, independently, a halogen or a $C_1$ to $C_7$ hydrocarbyl radical.

E. The process according to any one of embodiments A-D, wherein each X of Formula I, Formula II, or both is a benzyl radical.

F. The process according to any one of embodiments A-E, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ of Formula (1), each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula (II), or both are, independently, hydrogen, a halogen, or a $C_1$ to $C_{30}$ hydrocarbyl radical.

G. The process according to any one of embodiments A-F, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ of Formula (I), each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula (II), or both are, independently, hydrogen, a halogen, or a $C_1$ to $C_{10}$ hydrocarbyl radical.

H. The process according to any one of embodiments A-G, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ of Formula I is a methyl radical, a fluoride, or a combination thereof.

I. The process according to any one of embodiments A-H, wherein the catalyst compound is according to Formula I wherein,
   M is Zr;
   $X^1$ and $X^2$ are benzyl radicals;
   $R^1$ and $R^{14}$ are methyl radicals;
   $R^2$ through $R^{13}$ and $R^{15}$ through $R^{28}$ are hydrogen; and
   Y is —$CH_2CH_2$—.

J. The process according to any one of embodiments A-I, wherein the catalyst compound is according to Formula I wherein,
   M is Zr;
   $X^1$ and $X^2$ are benzyl radicals;
   $R^1$, $R^4$, $R^{14}$ and $R^{17}$ are methyl radicals;
   $R^2$, $R^3$, $R^5$ through $R^{13}$, $R^{15}$, $R^{16}$, $R^{18}$ through $R^{28}$ are hydrogen; and
   Y is —$CH_2CH_2$—.

K. The process according to any one of embodiments A-J, wherein, the catalyst compound is according to Formula I wherein,
M is Zr;
$X^1$ and $X^2$ are benzyl radicals;
$R^1$ and $R^{14}$ are methyl radicals;
$R^4$ and $R^{17}$ are fluoro groups;
$R^2$, $R^3$, $R^5$ through $R^{13}$, $R^{15}$, $R^{16}$, $R^{18}$ through $R^{28}$ are hydrogen; and
Y is —$CH_2CH_2$—.

L. The process according to any one of embodiments A-K, wherein the catalyst compound is according to Formula I wherein,
M is Zr;
$X^1$ and $X^2$ are benzyl radicals;
$R^1$, $R^4$, $R^{14}$ and $R^{17}$ are methyl radicals;
$R^8$, $R^{11}$, $R^{21}$ and $R^{24}$ are tert-butyl radicals;
$R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; and
Y is —$CH_2CH_2$—.

M. The process according to any one of embodiments A-L, wherein the catalyst compound is according to Formula I wherein,
M is Zr;
$X^1$ and $X^2$ are benzyl radicals;
$R^1$, $R^4$, $R^{14}$ and $R^{17}$ are methyl radicals;
$R^8$, $R^{11}$, $R^{21}$ and $R^{24}$ are mesityl radicals;
$R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; and
Y is —$CH_2CH_2$—.

N. The process according to any one of embodiments A-M, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula II is a methyl radical, a bromide, an adamantyl radical, or a combination thereof.

O. The process according to any one of embodiments A-N, wherein the catalyst compound is according to Formula II wherein,
M is Zr;
$X^1$ and $X^2$ are benzyl radicals;
$R^1$ and $R^{14}$ are methyl radicals;
$R^2$ through $R^{13}$, $R^{15}$, $R^{16}$, $R^{18}$, $R^{20}$ and $R^{21}$ are hydrogen;
$R^{17}$ and $R^{19}$ are bromine; and
Y is —$CH_2CH_2$—.

P. The process according to any one of embodiments A-O, wherein the catalyst compound is according to Formula II wherein,
M is Zr;
$X^1$ and $X^2$ are benzyl radicals;
$R^1$, $R^{14}$ and $R^{17}$ are methyl radicals;
$R^2$ through $R^{13}$, $R^{15}$, $R^{16}$, $R^{18}$, $R^{20}$, and $R^{21}$ are hydrogen;
$R^{19}$ is a 1-adamantyl radical; and
Y is —$CH_2CH_2$—.

Q. The process according to any one of embodiments A-P, wherein the catalyst compound is according to Formula II wherein,
M is Hf;
$X^1$ and $X^2$ are benzyl radicals;
$R^1$ and $R^{14}$ and $R^{17}$ are methyl radicals;
$R^2$ through $R^{13}$, $R^{15}$, $R^{16}$, $R^{18}$, $R^{20}$ and $R^{21}$ are hydrogen;
$R^{19}$ is a 1-adamantyl radical; and
Y is —$CH_2CH_2$—.

R. The process according to any one of embodiments A-Q, wherein Y of Formula I, Formula II, or both is —$CH_2CH_2$— or 1,2-cyclohexylene.

S. The process according to any one of embodiments A-R, wherein Y of Formula I, Formula II, or both is —$CH_2CH_2CH_2$—.

T. The catalyst compound of any one of embodiments A-S wherein Y of Formula I, Formula II, o both is a $C_1$-$C_{20}$ divalent hydrocarbyl radical comprising a linker backbone comprising from 1 to 18 carbon atoms bridging between nitrogen atoms $N^1$ and $N^2$.

U. The catalyst compound of any one of embodiments A-S wherein Y of Formula I, Formula II, o both is a $C_1$-$C_{20}$ divalent hydrocarbyl radical comprising O, S, S(O), $S(O)_2$, $Si(R')_2$, P(R'), N(R'), or a combination thereof, wherein each R' is independently a $C_1$-$C_{18}$ hydrocarbyl radical.

V. The process according to any one of embodiments A-U, wherein the activator comprises alumoxane, a non-coordinating anion activator, or a combination thereof.

W. The process according to any one of embodiments A-V, wherein the activator comprises alumoxane and the alumoxane is present at a ratio of 1 mole aluminum or more to mole of catalyst compound.

X. The process according to any one of embodiments A-W, wherein the activator is represented by the formula:

$$(Z)_d^+(A^{d-})$$

wherein Z is (L-H), or a reducible Lewis Acid, wherein L is a neutral Lewis base;
H is hydrogen;
$(L-H)^+$ is a Bronsted acid;
$A^{d-}$ is a non-coordinating anion having the charge d−; and
d is an integer from 1 to 3.

Y. The process according to any one of embodiments A-X, wherein the activator is represented by the formula:

$$(Z)_d^+(A^{d-})$$

wherein $A^{d-}$ is a non-coordinating anion having the charge d−;
d is an integer from 1 to 3, and
Z is a reducible Lewis acid represented by the formula: $(Ar_3C^+)$, where Ar is aryl radical, an aryl radical substituted with a heteroatom, an aryl radical substituted with one or more $C_1$ to $C_{40}$ hydrocarbyl radicals, an aryl radical substituted with one or more functional groups comprising elements from Groups 13-17 of the periodic table of the elements, or a combination thereof.

Z. The process according to any one of embodiments A-Y, wherein the activator is selected from the group consisting of: N,N-dimethylanilinium tetrakis(pentafluorophenyl)borate, triphenylcarbenium tetrakis(pentafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, [4-tert-butyl-PhNMe$_2$H][(C$_6$F$_3$(C$_6$F$_5$)$_2$)$_4$B], trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate, triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, di-(i-propyl)ammonium tetrakis(pentafluorophenyl)borate, dicyclohexylammonium tetrakis(pentafluorophenyl)borate, tri(o-tolyl)phosphonium tetrakis(pentafluorophenyl)borate, tri(2,6-dimethylphenyl)phosphonium tetrakis(pentafluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2,3,5,6-tetrafluoropyridine, triphenylcarbenium tetrakis(3,5-bis(trifluoromethyl)phenyl)borate), and combinations thereof.

A1. The process according to any one of embodiments A-Z, wherein the temperature is from about 0° C. to about 300° C., the pressure is from about 0.35 MPa to about 10 MPa, the time is from about 0.1 minutes to about 24 hours, or a combination thereof.

B1. The process according to any one of embodiments A-A1, wherein the temperature is from about 50° C. to about 150° C.

C1. The process according to any one of embodiments A-B1, wherein the polymer comprises at least 50 mole % ethylene.

D1. The process according to any one of embodiments A-C1, wherein the polymer comprises at least 75 mole % ethylene.

E1. The process according to any one of embodiments A-D1, wherein the polymer comprises at least 99.9 mole % ethylene.

F1. The process according to any one of embodiments A-E1, wherein the polymer comprises:
  a) at least 0.5 branches having 7 or more carbon atoms per 1000 carbon atoms polymer;
  b) a Tm of 100° C. or more determined by DSC;
  c) a ratio of saturated chain ends to allyl chain ends of 1:1 to 5:1;
  d) a ratio of vinyl groups per molecule as determined by $^{13}$C NMR of at least 50%;
  e) an Mn of at least 250 g/mol as determined by $^1$H NMR; or a combination thereof.

G1. The process according to any one of embodiments A-F1, wherein the polymer comprises an Mn of 250 g/mol to 100,000 g/mol.

H1. The process according to any one of embodiments A-G1, wherein the polymer comprises at least 1.0 branches having 7 or more carbon atoms per 1000 carbon atoms polymer.

I1. The process according to any one of embodiments A-H1, wherein the polymer comprises a Tm of 110° C. or more.

J1. The process according to any one of embodiments A-I1, wherein the polymer has less than 1400 ppm aluminum as determined by ICPES, less than 1400 ppm of the Group 3, 4, 5, or 6 transition metal, as determined by ICPES, or a combination thereof.

K1. The process according to any one of embodiments A-J1, wherein the polymer has a density of greater than 0.96 g/cc.

L1. The process according to any one of embodiments A-K1, wherein the polymer has a branching index g'vis of 0.90 or less.

M1. The process according to any one of embodiments A-L1, wherein the one or more olefins comprise propylene.

N1. The process according to any one of embodiments A-M1, wherein the polyolefin comprises at least 50 mole % propylene.

O1. A polyolefin polymer comprising:
  a) at least 50% allyl chain ends; and
  b) an Mn of at least 200 g/mol, as determined by $^1$H NMR;
  the polymer produced by a process comprising:
    contacting one or more olefins with a catalyst system at a temperature, a pressure, and for a period of time sufficient to produce the polyolefin polymer;
    the catalyst system comprising an activator and a catalyst compound according to Formula I, Formula II, or a combination thereof:
  Formula I being represented by:

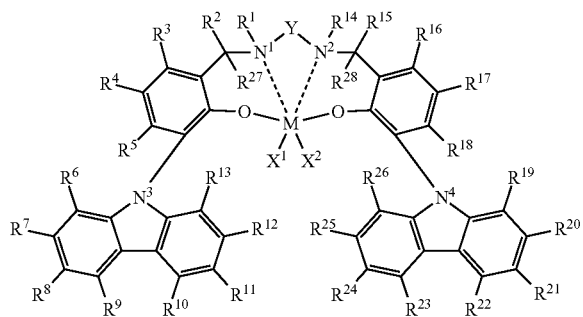

M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and
Y is a divalent $C_1$ to $C_{20}$ hydrocarbyl;
Formula II being represented by:

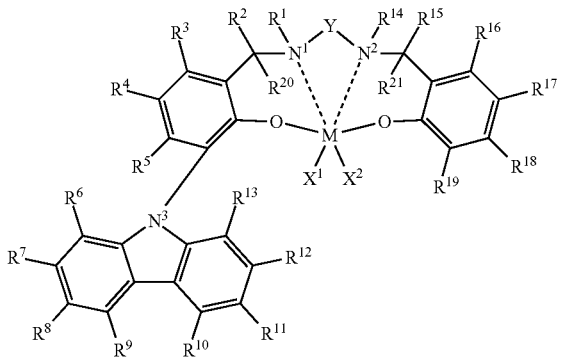

wherein M is a Group 3, 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided, however, where M is trivalent then $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
Y is a divalent $C_1$ to $C_{20}$ hydrocarbyl radical, and/or
wherein the polyolefin polymer is produced according to any one of embodiments A-M1.

P1. The polyolefin polymer according to embodiment O1, comprising at least 50 mole % ethylene.

Q1. The polyolefin polymer according to any one of embodiments O1-P1, comprising at least 75 mole % ethylene.

R1. The polyolefin polymer according to any one of embodiments O1-Q1, comprising at least 99.9 mole % ethylene.

S1. The polyolefin polymer according to any one of embodiments O1-R1, comprising:
  a) at least 0.5 branches having 7 or more carbon atoms per 1000 carbon atoms polymer;
  b) a Tm of 100° C. or more determined by DSC;
  c) a ratio of saturated chain ends to allyl chain ends of 1:1 to 5:1;
  d) a ratio of vinyl groups per molecule as determined by $^{13}$C NMR of at least 50%;
  e) an Mn of at least 250 g/mol as determined by $^1$H NMR; or a combination thereof.

T1. The polyolefin polymer according to any one of embodiments O1-S1, comprising an Mn of 250 g/mol to 100,000 g/mol.

U1. The polyolefin polymer according to any one of embodiments O1-T1, comprising at least 1.0 branches having 7 or more carbon atoms per 1000 carbon atoms polymer.

V1. The polyolefin polymer according to any one of embodiments O1-U1, comprising a Tm of 110° C. or more.

W1. The polyolefin polymer according to any one of embodiments O1-V1, comprising less than 1400 ppm aluminum as determined by ICPES, less than 1400 ppm of the Group 3, 4, 5, or 6 transition metal, as determined by ICPES, or a combination thereof.

X1. The polyolefin polymer according to any one of embodiments O1-W1, comprising a density of greater than 0.96 g/cc.

Y1. The polyolefin polymer according to any one of embodiments O1-X1, comprising a branching index g'vis of 0.90 or less.

Z1. The polyolefin polymer according to any one of embodiments O1-Y1, comprising propylene.

A2. The polyolefin polymer according to any one of embodiments O1-A2, comprising at least 50 mole % propylene.

EXAMPLES

The foregoing discussion can be further described with reference to the following non-limiting examples. Four illustrative catalyst compounds (A, B, C and D), each according to one or more embodiments described, were synthesized and some were used to polymerize olefins. All reactions were carried out under a purified nitrogen atmosphere using standard glovebox, high vacuum or Schlenk techniques, unless otherwise noted. All solvents used were anhydrous, de-oxygenated and purified according to known procedures. All starting materials were either purchased from Aldrich and purified prior to use or prepared according to procedures known to those skilled in the art.

Synthesis of Compounds A-D:

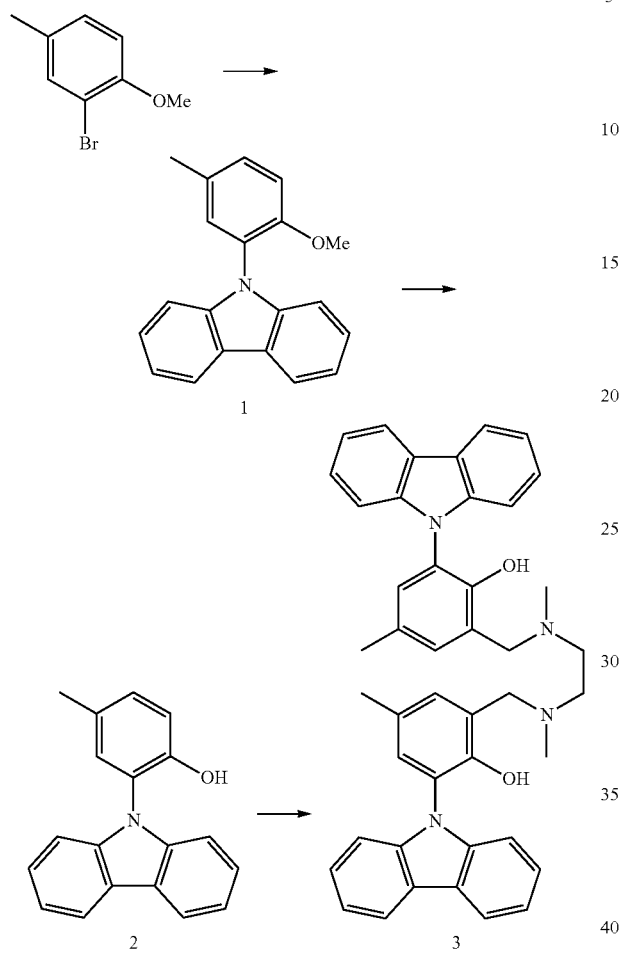

9-(2-Methoxy-5-methylphenyl)-9H-carbazole (1)

2-Bromo-4-methylanisole (20.11 g, 100 mmol, 1 equiv) and carbazole (20.06 g, 120 mmol, 1.2 equiv) were dissolved in 1,4-dioxane (400 mL). Potassium phosphate tribasic (37.15 g, 175 mmol, 1.75 equiv), copper (I) iodide (0.95 g, 5 mmol, 0.05 equiv) and racemic trans-1,2-diaminocyclohexane (2.4 mL, 20 mmol, 0.2 equiv) were added and the reaction was refluxed for two days. The reaction was cooled to room temperature, then partitioned with ethyl acetate (200 mL) and water (300 mL). The aqueous layer was extracted with ethyl acetate (3×200 mL). The combined organic layers were washed with saturated brine, dried over sodium sulfate, filtered, and concentrated under reduced pressure. The residue was purified over silica gel (150 g), eluting with 3% ethyl acetate in heptanes to give compound 1 (13.5 g, 45% yield) as a yellow solid.

2-(9H-Carbazol-9-yl)-4-methylphenol (2)

A 1.0 M boron tribromide solution in dichloromethane (90 mL, 90 mmol, 1.9 equiv) was added dropwise at −78° C., over 30 minutes, to a solution of compound 1 (13.5 g, 46.98 mmol, 1 equiv) in anhydrous dichloromethane (400 mL). The reaction was warmed to room temperature, when liquid chromatography-mass spectrometry (LCMS) indicated that the reaction was complete. The reaction was quenched with ice-water (200 mL). The layers were separated and the aqueous phase was extracted with dichloromethane (2×100 mL). The combined organic layers were dried over sodium sulfate, filtered, and concentrated under reduced pressure. The residue was purified on an ANALOGIX 40-150 g column, eluting with a gradient of 0 to 20% ethyl acetate in heptanes to give compound 2 (12.3 g, 95% yield) as a yellow oil.

6,6'-((Ethane-1,2-diylbis(methylazanediyl))bis(methylene))bis(2-(9H-carbazol-9-yl)-4-methylphenol) (3)

A mixture of compound 2 (3.4 g, 12.44 mmol, 2 equiv), paraformaldehyde (1.87 g, 62.2 mmol, 10 equiv), N,N'-dimethylethylenediamine (0.67 mL, 6.22 mmol, 1 equiv) and anhydrous ethanol (100 mL) was refluxed for 18 hours. The reaction was cooled to room temperature, and then concentrated under reduced pressure. The residue was purified on an ANALOGIX 25-60 g column, eluting with a gradient of 0 to 30% ethyl acetate in heptanes to give compound 3 (1.1 g, 27% yield) as a white solid.

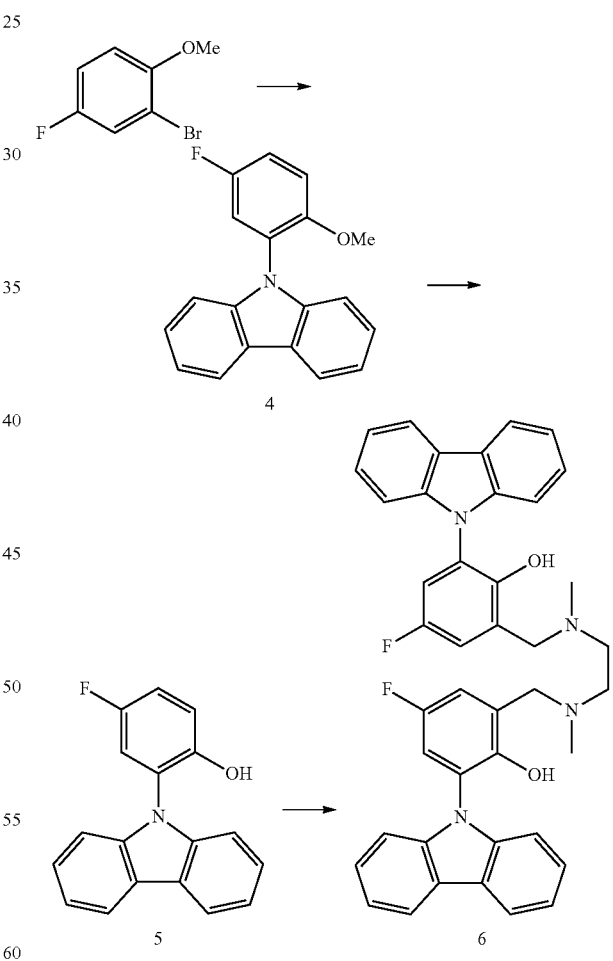

9-(5-Fluoro-2-methoxyphenyl)-9H-carbazole (4)

2-Bromo-4-fluoroanisole (20 g, 10 mmol, 1 equiv) and carbazole (18.4 g, 11 mmol, 1.1 equiv) were dissolved in 1,4-dioxane (200 mL). Potassium phosphate tribasic hydrate (46 g, 20 mmol, 2 equiv), copper(I) iodide (1 g, 0.5 mmol, 0.05 equiv) and 1,2-diaminopropane (1 mL, 1.3 mmol, 0.13 equiv) were added and the reaction was refluxed for 18 hours. The reaction was cooled to room temperature and filtered through celite. The filtrate was concentrated under reduced pressure and the residue was purified over silica gel (250 g), eluting with gradient of 0 to 10% ethyl acetate in heptanes to give compound 4 (7.6 g, 26% yield) as an off white solid that was contaminated with carbazole. This material was used subsequently.

2-(9H-Carbazol-9-yl)-4-fluorophenol (5)

A 1.0 M boron tribromide solution in dichloro-methane (60 mL, 60 mmol, 3 equiv) was added dropwise over 30 minutes at −78° C. to a solution of compound 4 (5.8 g, 20 mmol, 1 equiv) in dichloromethane (60 mL). The reaction was stirred at −78° C. for 4 hours, when $^1$H-NMR indicated that the reaction was complete. The reaction was poured into saturated sodium bicarbonate (100 mL) and the pH adjusted to 8 with 10% sodium hydroxide. The layers were separated and the aqueous phase was extracted with dichloro-methane (3×20 mL). The combined organic layers were dried over sodium sulfate, filtered, and concentrated under reduced pressure. The residue was purified over silica gel (100 g), eluting with a gradient of 60 to 100% dichloromethane in heptanes. The product containing fractions were combined, concentrated under reduced pressure and triturated with 20% methyl tert-butyl ether in heptanes (10 mL) to give compound 5 (4.3 g, 78% yield) as a white solid.

6,6'-((Ethane-1,2-diylbis(methylazanediyl))bis(methylene))bis(2-(9H-carbazol-9-yl)-4-fluorophenol) (6)

A mixture of compound 5 (1.5 g, 5.4 mmol, 2 equiv), paraformaldehyde (716 mg, 5.4 mmol, 2 equiv), N,N'-dimethylethylenediamine (300 μL, 2.7 mmol, 1 equiv) and anhydrous ethanol (20 mL) was refluxed for 18 hours (reaction was ~60% complete after 2 hours). The reaction was cooled to room temperature, then concentrated under reduced pressure. The residue was purified over silica gel (50 g), eluting with a gradient of 60 to 100% dichloromethane in heptanes to give compound 6 (640 mg, 34% yield) as a white solid.

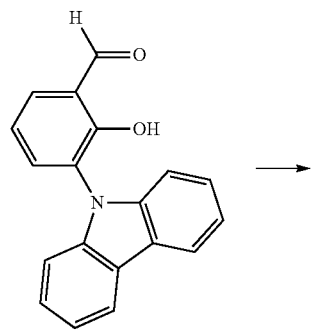

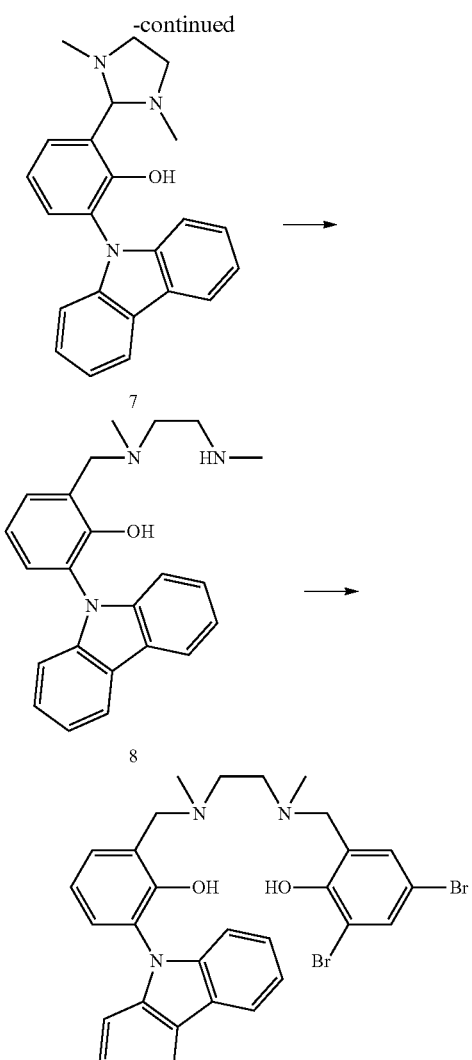

2-(9H-carbazol-9-yl)-6-(1,3-dimethylimidazolidin-2-yl)phenol (7)

In a 100 mL round bottom flask, 2-(9H-carbazol-9-yl)salicylaldehyde (0.573 g, 2.06 mmol) was dissolved in 30 mL of methanol and heated to 50° C. Ethylenediamine (0.176 g, 2.00 mmol) was also dissolved in 10 mL of methanol. When all of the 2-(9H-carbazol-9-yl)salicylaldehyde was dissolved, the solution of ethylene diamine was slowly added. After two hours, the flask was removed from the heat source and allowed to cool overnight. A precipitate was collected and used in the next step without further purification.

2-(9H-carbazol-9-yl)-6-((methyl(2-(methylamino)ethyl)amino)methyl)phenol (8)

A slurry of 7 from the previous synthesis was stirred at room temperature in a 100 mL round bottom flask. Sodium borohydride (0.640 g, 16.9 mmol) was added in small portions over 30 minutes. Gas evolution was observed. After three hours, the methanol was removed under vacuum and water was added. The resulting solids were filtered and washed with cold methanol. The white solids were dried under vacuum to yield 8 (0.585 g, 79% yield).

2-(((2-((3-(9H-carbazol-9-yl)-2-hydroxybenzyl)(methyl)amino)ethyl)(methyl)-amino)methyl)-4,6-dibromophenol (9)

8 (0.218 g, 0.606 mmol) and 2-bromomethyl-4,6-dibromophenol (0.209 g, 0.606 mmol) were dissolved in 20 mL of THF. Triethylamine (1.2 mL, 8.61 mmol) was added to the slightly pink solution. A white precipitate formed immediately. The reaction was allowed to stir overnight after which time the volatiles were removed and methanol added to make a slurry. The solids were filtered and dried under vacuum resulting in a white solid (0.215 g, 57% yield).

A
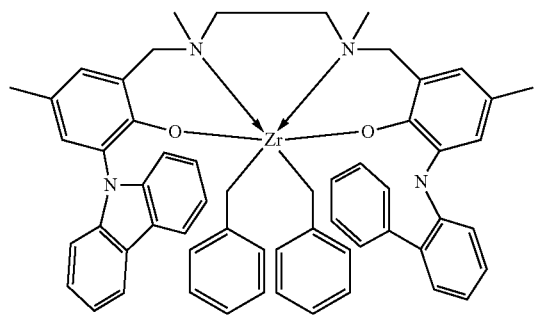

B
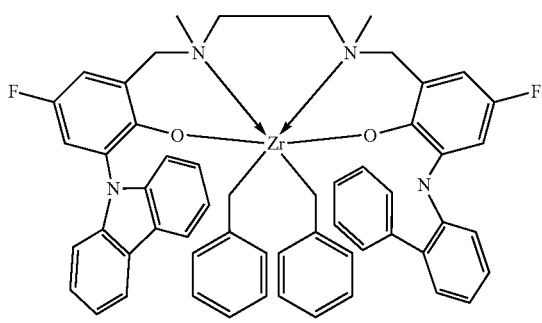

C
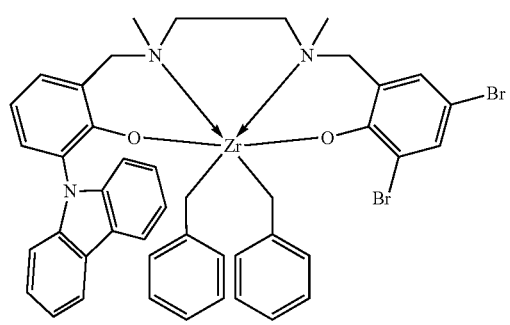

D
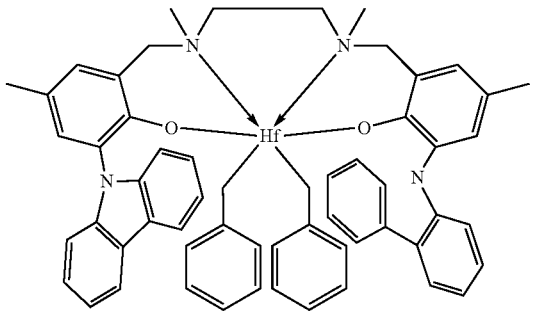

[6,6'-((Ethane-1,2-diylbis(methylazanediyl))bis(methylene))bis(2-(9H-carbazol-9-yl)-4-methylphenol)] zirconium(IV)dibenzyl (A)

Under a nitrogen atmosphere, a toluene solution (5 mL) of 3 (107 mg, 0.17 mmol) was added to a yellow toluene solution (5 mL) of $ZrBn_4$ (77 mg, 0.17 mmol), forming a deep yellow solution. After stirring at room temperature for 15 minutes, the solvent was removed to give a yellow sticky solid. The product was washed with pentane and dried under vacuum to give compound A as a yellow solid (yield 135 mg, 88%). Compounds B through D were made in a similar manner from compounds 6, 9 or 3 and the corresponding Group IV tetrabenzyl precursors.

Polymerization Process:

Ethylene polymerizations were carried out in a parallel pressure reactor, which is described in U.S. Pat. Nos. 6,306,658, 6,455,316 and 6,489,1681; WO 00/09255; and Murphy et al., J. Am. Chem. Soc., 2003, 125, 4306-4317, each of which is incorporated herein by reference. A pre-weighed glass vial insert and disposable stirring paddle were fitted to each reaction vessel of the reactor, which contained 48 individual reaction vessels. The reactor was then closed and each vessel was individually heated to a set temperature (between 75 and 140° C.) and pressurized to a pre-determined pressure of ethylene (generally 0.93 MPa (135 psi)). Five hundred equivalents of methylalumoxane solution (30 wt % in toluene) were then added to act as a co-catalyst/scavenger. The contents of the vessel were then stirred at 800 rpm. A toluene solution of catalyst (A-D, 0.20 mmol/L, 5-20 nmol) and another aliquot of isohexane (500 uL) were then added to the reactor. All runs were performed in quadruplicate. While maintaining ethylene pressure in each reaction vessel at the pre-set level by computer control, the reaction was then allowed to proceed until a set time limit (usually 30 min) or until a set amount of ethylene had been taken up by the reaction. At this point, the reaction was quenched by exposure to air. After the polymerization reaction, the glass vial insert containing the polymer product and solvent were removed from the pressure cell and the inert atmosphere glovebox, and the volatile components were removed using a GENEVAC HT-12 centrifuge and GENEVAC VC3000D vacuum evaporator operating at elevated temperature and reduced pressure. Representative polymer samples from each catalyst under each polymerization condition were collected and analyzed by $^1H$ and $^{13}C$ NMR spectroscopy to determine properties such as Mn, number of ethyl branches/1000 carbons, amount of long chain branching (LCB)/1000 carbons and number of vinyl end groups per polymer chain.

Polymerization data shown in Table 1 are intended to be representative of the catalytic behavior of compounds A-D and not comprehensive.

TABLE 1

Selected High Throughput Polymerization Results

| Run | Cat. | Activator | Temp. (° C.) | Amount (nmol) | Pressure (MPa(g)) | Time (sec) | Yield (mg) | Activity (g/mmol/h/b) |
|---|---|---|---|---|---|---|---|---|
| 1 | A | MAO | 75 | 10 | 0.931 | 6 | 179 | 1,154,000 |
| 2 | A | MAO | 75 | 10 | 0.931 | 5 | 191 | 1,479,000 |
| 3 | A | MAO | 75 | 10 | 0.931 | 8 | 198 | 955,000 |
| 4 | A | MAO | 75 | 10 | 0.931 | 8 | 204 | 984,000 |
| 5 | A | MAO | 95 | 10 | 0.931 | 8 | 154 | 743,000 |
| 6 | A | MAO | 95 | 10 | 0.931 | 9 | 160 | 689,000 |
| 7 | A | MAO | 95 | 10 | 0.931 | 9 | 143 | 615,000 |
| 8 | A | MAO | 95 | 10 | 0.931 | 8 | 136 | 655,000 |
| 9 | A | MAO | 115 | 10 | 0.931 | 10 | 115 | 446,000 |
| 10 | A | MAO | 115 | 10 | 0.931 | 11 | 100 | 352,000 |
| 11 | A | MAO | 115 | 10 | 0.931 | 13 | 83 | 245,000 |
| 12 | A | MAO | 115 | 10 | 0.931 | 16 | 73 | 176,000 |
| 13 | A | MAO | 120 | 5 | 0.931 | 16 | 83 | 401,000 |
| 14 | A | MAO | 120 | 5 | 0.931 | 14 | 88 | 485,000 |
| 15 | A | MAO | 120 | 5 | 0.931 | 16 | 77 | 372,000 |
| 16 | A | MAO | 120 | 5 | 0.931 | 13 | 72 | 429,000 |
| 17 | A | MAO | 130 | 5 | 0.931 | 50 | 60 | 92,500 |
| 18 | A | MAO | 130 | 5 | 0.931 | 43 | 57 | 102,000 |
| 19 | A | MAO | 130 | 5 | 0.931 | 136 | 53 | 29,900 |
| 20 | A | MAO | 130 | 5 | 0.931 | 122 | 52 | 32,700 |
| 21 | A | MAO | 140 | 5 | 0.931 | 1800 | 33 | 1420 |
| 22 | A | MAO | 140 | 5 | 0.931 | 1805 | 17 | 720 |
| 23 | A | MAO | 140 | 5 | 0.931 | 1803 | 12 | 520 |
| 24 | A | MAO | 140 | 5 | 0.931 | 1803 | 3 | 130 |
| 25 | B | MAO | 75 | 5 | 0.931 | 8 | 181 | 1,750,000 |
| 26 | B | MAO | 75 | 5 | 0.931 | 6 | 177 | 2,276,000 |
| 27 | B | MAO | 75 | 5 | 0.931 | 8 | 168 | 1,625,000 |
| 28 | B | MAO | 75 | 5 | 0.931 | 5 | 161 | 2,493,000 |
| 29 | B | MAO | 95 | 5 | 0.931 | 8 | 89 | 864,000 |
| 30 | B | MAO | 95 | 5 | 0.931 | 8 | 89 | 863,000 |
| 31 | B | MAO | 95 | 5 | 0.931 | 8 | 96 | 932,000 |
| 32 | B | MAO | 95 | 5 | 0.931 | 10 | 73 | 565,000 |
| 33 | B | MAO | 115 | 5 | 0.931 | 16 | 65 | 313,000 |
| 34 | B | MAO | 115 | 5 | 0.931 | 484 | 40 | 6390 |
| 35 | B | MAO | 115 | 5 | 0.931 | 21 | 65 | 240,000 |
| 36 | B | MAO | 115 | 5 | 0.931 | 33 | 54 | 127,000 |
| 37 | B | MAO | 120 | 5 | 0.931 | 72 | 50 | 53,800 |
| 38 | B | MAO | 120 | 5 | 0.931 | 70 | 52 | 57,800 |
| 39 | B | MAO | 120 | 5 | 0.931 | 74 | 52 | 54,700 |
| 40 | B | MAO | 120 | 5 | 0.931 | 37 | 62 | 130,000 |
| 41 | B | MAO | 130 | 5 | 0.931 | 603 | 43 | 5550 |
| 42 | B | MAO | 130 | 5 | 0.931 | 1806 | 40 | 1720 |
| 43 | B | MAO | 130 | 5 | 0.931 | 1800 | 18 | 790 |
| 44 | B | MAO | 130 | 5 | 0.931 | 1805 | 43 | 1830 |
| 45 | B | MAO | 140 | 5 | 0.931 | 1801 | 13 | 540 |
| 46 | B | MAO | 140 | 5 | 0.931 | 1802 | 3 | 120 |
| 47 | B | MAO | 140 | 5 | 0.931 | 1807 | 8 | 330 |
| 48 | B | MAO | 140 | 5 | 0.931 | 1803 | 2 | 90 |
| 49 | C | MAO | 75 | 5 | 0.931 | 14 | 134 | 741,000 |
| 50 | C | MAO | 75 | 5 | 0.931 | 14 | 140 | 774,000 |
| 51 | C | MAO | 75 | 5 | 0.931 | 11 | 120 | 846,000 |
| 52 | C | MAO | 75 | 5 | 0.931 | 11 | 129 | 910,000 |
| 53 | C | MAO | 95 | 5 | 0.931 | 14 | 82 | 454,000 |
| 54 | C | MAO | 95 | 5 | 0.931 | 11 | 79 | 557,000 |
| 55 | C | MAO | 95 | 5 | 0.931 | 14 | 67 | 372,000 |
| 56 | C | MAO | 95 | 5 | 0.931 | 12 | 85 | 547,000 |
| 57 | C | MAO | 115 | 5 | 0.931 | 85 | 49 | 44,900 |
| 58 | C | MAO | 115 | 5 | 0.931 | 60 | 47 | 60,700 |
| 59 | C | MAO | 115 | 5 | 0.931 | 42 | 51 | 94,100 |
| 60 | C | MAO | 115 | 5 | 0.931 | 163 | 40 | 19,200 |
| 61 | C | MAO | 120 | 5 | 0.931 | 1804 | 24 | 1010 |
| 62 | C | MAO | 120 | 5 | 0.931 | 232 | 46 | 15,500 |
| 63 | C | MAO | 120 | 5 | 0.931 | 1802 | 35 | 1490 |
| 64 | C | MAO | 120 | 5 | 0.931 | 296 | 45 | 11,700 |
| 65 | C | MAO | 130 | 5 | 0.931 | 1807 | 16 | 680 |
| 66 | C | MAO | 130 | 5 | 0.931 | 1806 | 12 | 510 |
| 67 | C | MAO | 130 | 5 | 0.931 | 1802 | 7 | 320 |
| 68 | C | MAO | 130 | 5 | 0.931 | 1802 | 15 | 660 |
| 69 | C | MAO | 140 | 5 | 0.931 | 1800 | 0 | 0 |
| 70 | C | MAO | 140 | 5 | 0.931 | 1805 | 1 | 60 |
| 71 | C | MAO | 140 | 5 | 0.931 | 1802 | 3 | 130 |
| 72 | C | MAO | 140 | 5 | 0.931 | 1801 | 2 | 70 |
| 73 | D | MAO | 75 | 5 | 0.931 | 28 | 81 | 223,000 |
| 74 | D | MAO | 75 | 5 | 0.931 | 26 | 81 | 242,000 |
| 75 | D | MAO | 75 | 5 | 0.931 | 26 | 78 | 231,000 |

TABLE 1-continued

Selected High Throughput Polymerization Results

| Run | Cat. | Activator | Temp. (° C.) | Amount (nmol) | Pressure (MPa(g)) | Time (sec) | Yield (mg) | Activity (g/mmol/h/b) |
|---|---|---|---|---|---|---|---|---|
| 76 | D | MAO | 75 | 5 | 0.931 | 26 | 75 | 223,000 |
| 77 | D | MAO | 95 | 5 | 0.931 | 30 | 20 | 51,300 |
| 78 | D | MAO | 95 | 5 | 0.931 | 30 | 66 | 171,000 |
| 79 | D | MAO | 95 | 5 | 0.931 | 32 | 63 | 152,000 |
| 80 | D | MAO | 95 | 5 | 0.931 | 30 | 65 | 167,000 |
| 81 | D | MAO | 115 | 5 | 0.931 | 69 | 51 | 57,000 |
| 82 | D | MAO | 115 | 5 | 0.931 | 1800 | 0 | 0 |
| 83 | D | MAO | 115 | 5 | 0.931 | 75 | 51 | 52,500 |
| 84 | D | MAO | 115 | 5 | 0.931 | 1800 | 4 | 160 |
| 85 | D | MAO | 120 | 5 | 0.931 | 1801 | 11 | 490 |
| 86 | D | MAO | 120 | 5 | 0.931 | 1801 | 32 | 1370 |
| 87 | D | MAO | 120 | 5 | 0.931 | 1802 | 26 | 1130 |
| 88 | D | MAO | 120 | 5 | 0.931 | 1802 | 30 | 1290 |
| 89 | D | MAO | 130 | 5 | 0.931 | 1803 | 6 | 280 |
| 90 | D | MAO | 130 | 5 | 0.931 | 1800 | 3 | 110 |
| 91 | D | MAO | 130 | 5 | 0.931 | 1801 | 9 | 370 |
| 92 | D | MAO | 130 | 5 | 0.931 | 1800 | 3 | 130 |
| 93 | D | MAO | 140 | 5 | 0.931 | 1801 | 3 | 110 |
| 94 | D | MAO | 140 | 5 | 0.931 | 1801 | 1 | 60 |
| 95 | D | MAO | 140 | 5 | 0.931 | 1800 | 2 | 90 |
| 96 | D | MAO | 140 | 5 | 0.931 | 1802 | 3 | 130 |

TABLE 2

Selected Polymer Characterization

| Run | 1 | 5 | 9 | 13 | 17 | 25 | 49 | 73 |
|---|---|---|---|---|---|---|---|---|
| Catalyst | A | A | A | A | A | B | C | D |
| Temperature (° C.) | 75 | 95 | 115 | 120 | 130 | 75 | 75 | 75 |
| Ethyl branches/1000 C | 0.5 | 0.4 | 0.4 | 0.3 | 0.5 | 1.2 | 0.7 | 0.2 |
| LCB*/1000 C | 2.2 | 2.1 | 1.4 | 0.7 | 0.7 | 2.3 | 0.7 | 0.1 |
| g'(vis) | 0.775 | ND | ND | ND | ND | | 0.835 | |
| Mn (by $^1$H NMR) | 4,163 | 3,511 | 2,922 | 2,777 | 2,758 | 3,039 | 2,863 | 10,189 |
| Mn (by GPC) | 4,798 | ND | ND | ND | ND | | 2,622 | |
| Density (g/cc) | 0.962 | ND | ND | ND | ND | 0.964 | >0.970 | 0.966 |
| Ethyl branches/molecule | 0.15 | 0.10 | 0.08 | 0.06 | 0.10 | 0.26 | 0.15 | 0.15 |
| LCB*/molecule | 0.64 | 0.54 | 0.29 | 0.14 | 0.14 | 0.50 | 0.14 | 0.08 |
| Vinyl groups/molecule | 0.95 | 0.97 | 0.94 | 0.94 | 0.93 | 0.95 | 0.98 | 0.88 |

Notes:
LCB* = Long Chain Branching is longer than 6 carbons and calculations assume all LCB is "Y-type".
ND = not determined As the data show, the catalyst compounds, catalyst systems, and polymerization processes disclosed herein provide novel and improved catalyst and systems for the polymerization of olefins, which produce polymers having improved properties, such as high polymer melting point, high polymer molecular weights, an increased conversion and/or comonomer incorporation, which may further include a significant amount of long chain branching and/or a significant amount of vinyl termination.

The catalysts in an embodiment provide improvement in catalyst activity, produce polymers with improved properties or both. In an embodiment crystallographic techniques indicate that the appended ring system or systems (e.g., the carbazole ring systems) are oriented transversely, e.g., perpendicular, to the phenol rings. In an embodiment these catalysts have a structure to provide a broad corridor for the polymeryl moiety to reside and for the monomer to insert during the polymerization process. As such, catalysts according to one embodiment of the instant disclosure provide for an ability to control one or more characteristics of polymerization, tacticity, comonomer insertion, and the like.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:
1. A process comprising:
contacting one or more olefins with a catalyst system at a temperature, a pressure, and for a period of time sufficient to produce a polyolefin comprising a) at least 50% allyl chain ends; and
b) an Mn of at least 200 g/mol, as determined by $^1$H NMR;
the catalyst system comprising an activator and a catalyst compound according to Formula I, Formula II, or a combination thereof:
Formula I being represented by:

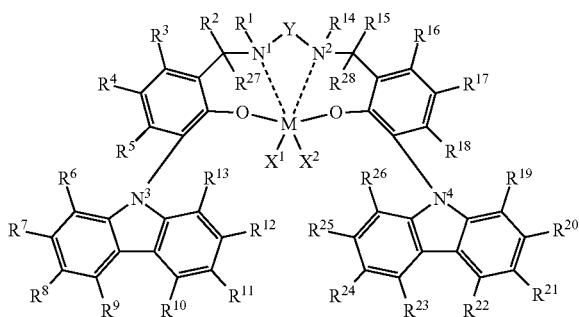

wherein M is a Group 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and
Y is a divalent $C_1$ to $C_{20}$ hydrocarbyl;
Formula II being represented by:

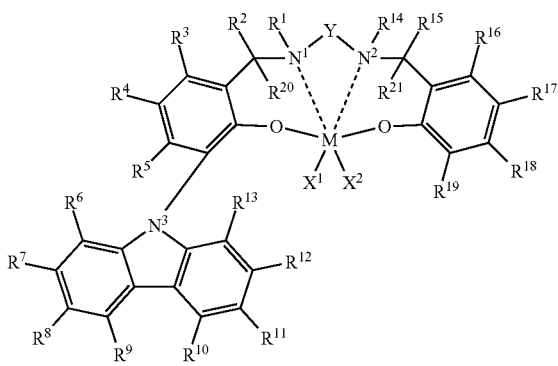

wherein M is a Group 4, 5 or 6 transition metal;
each X is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and Y is a divalent $C_1$ to $C_{20}$ hydrocarbyl radical.

2. The process of claim 1, wherein two or more of $R^1$ to $R^{28}$ of Formula I, $R^1$ to $R^{21}$ of Formula II, or a both, independently join together to form a $C_4$ to $C_{62}$ cyclic or polycyclic ring structure.

3. The process of claim 1, wherein M of Formula I, Formula II, or both is Hf, Ti, or Zr.

4. The process of claim 1, wherein each X of Formula I, Formula II, or both is, independently, a halogen or a $C_1$ to $C_7$ hydrocarbyl radical.

5. The process of claim 1, wherein each X of Formula I, Formula II, or both is a benzyl radical.

6. The process of claim 1, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$ and $R^{28}$ of Formula I, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula II, or both are, independently, hydrogen, a halogen, or a $C_1$ to $C_{30}$ hydrocarbyl radical.

7. The process of claim 1, wherein the catalyst compound is according to Formula I wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is a methyl radical, a fluoride, or a combination thereof.

8. The process of claim 1, wherein the catalyst compound is according to Formula I wherein,
M is Zr;
$X^1$ and $X^2$ are benzyl radicals;
$R^1$ and $R^{14}$ are methyl radicals;
$R^2$ through $R^{13}$ and $R^{15}$ through $R^{28}$ are hydrogen; and
Y is —CH$_2$CH$_2$—.

9. The process of claim 1, wherein the catalyst compound is according to Formula I wherein,
M is Zr;
$X^1$ and $X^2$ are benzyl radicals;
$R^1$, $R^4$, $R^{14}$ and $R^{17}$ are methyl radicals;
$R^2$, $R^3$, $R^5$ through $R^{13}$, $R^{15}$, $R^{16}$, $R^{18}$ through $R^{28}$ are hydrogen; and
Y is —CH$_2$CH$_2$—.

10. The process of claim 1, wherein the catalyst compound is according to Formula I wherein,
M is Zr;
$X^1$ and $X^2$ are benzyl radicals;
$R^1$ and $R^{14}$ are methyl radicals;
$R^4$ and $R^{17}$ are fluoro groups;
$R^2$, $R^3$, $R^5$ through $R^{13}$, $R^{15}$, $R^{16}$, $R^{18}$ through $R^{28}$ are hydrogen; and
Y is —CH$_2$CH$_2$—.

11. The process of claim 1, wherein the catalyst compound is according to Formula I wherein,
M is Zr;
$X^1$ and $X^2$ are benzyl radicals;
$R^1$, $R^4$, $R^{14}$ and $R^{17}$ are methyl radicals;
$R^8$, $R^{11}$, $R^{21}$ and $R^{24}$ are tert-butyl radicals;
$R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; and
Y is —CH$_2$CH$_2$—.

12. The process of claim 1, wherein the catalyst compound is according to Formula I wherein,
M is Zr;
$X^1$ and $X^2$ are benzyl radicals;
$R^1$, $R^4$, $R^{14}$ and $R^{17}$ are methyl radicals;
$R^8$, $R^{11}$, $R^{21}$ and $R^{24}$ are mesityl radicals;

$R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; and Y is —$CH_2CH_2$—.

13. The process of claim 1, wherein the catalyst compound is according to Formula II wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is a methyl radical, a bromide, an adamantyl radical, or a combination thereof.

14. The process of claim 1, wherein the catalyst compound is according to Formula II wherein, M is Zr;
$X^1$ and $X^2$ are benzyl radicals;
$R^1$ and $R^{14}$ are methyl radicals;
$R^2$ through $R^{13}$, $R^{15}$, $R^{16}$, $R^{18}$, $R^{20}$ and $R^{21}$ are hydrogen;
$R^{17}$ and $R^{19}$ are bromine; and
Y is —$CH_2CH_2$—.

15. The process of claim 1, wherein the catalyst compound is according to Formula II wherein, M is Zr;
$X^1$ and $X^2$ are benzyl radicals;
$R^1$, $R^{14}$ and $R^{17}$ are methyl radicals;
$R^2$ through $R^{13}$, $R^{15}$, $R^{16}$, $R^{18}$, $R^{20}$, and $R^{21}$ are hydrogen;
$R^{19}$ is a 1-adamantyl radical; and
Y is —$CH_2CH_2$—.

16. The process of claim 1, wherein the catalyst compound is according to Formula II wherein, M is Hf;
$X^1$ and $X^2$ are benzyl radicals;
$R^1$ and $R^{14}$ and $R^{17}$ are methyl radicals;
$R^2$ through $R^{13}$, $R^{15}$, $R^{16}$, $R^{18}$, $R^{20}$ and $R^{21}$ are hydrogen;
$R^{19}$ is a 1-adamantyl radical; and
Y is —$CH_2CH_2$—.

17. The process of claim 1, wherein Y of Formula I, Formula II, or both is —$CH_2CH_2$— or 1,2-cyclohexylene.

18. The process of claim 1, wherein Y of Formula I, Formula II, or both is —$CH_2CH_2CH_2$—.

19. The process of claim 1, wherein Y of Formula I, Formula II, or both is a $C_1$-$C_{20}$ divalent hydrocarbyl radical comprising a linker backbone comprising from 1 to 18 carbon atoms bridging between nitrogen atoms $N^1$ and $N^2$.

20. The process of claim 1, wherein Y of Formula I, Formula II, or both is a $C_1$-$C_{20}$ divalent hydrocarbyl radical comprising O, S, S(O), S(O)$_2$, Si(R')$_2$, P(R'), N(R'), or a combination thereof, wherein each R' is independently a $C_1$-$C_{18}$ hydrocarbyl radical.

21. The process of claim 1, wherein the polymer has less than 1400 ppm aluminum as determined by ICPES, less than 1400 ppm of the Group 4, 5, or 6 transition metal, as determined by ICPES, or a combination thereof.

22. The process of claim 1, wherein the polyolefin comprises at least 50 mole % ethylene.

23. The process of claim 1, wherein the polyolefin comprises:
a) at least 0.5 branches having 7 or more carbon atoms per 1000 carbon atoms polymer;
b) a Tm of 100° C. or more determined by DSC;
c) a ratio of saturated chain ends to allyl chain ends of 1:1 to 5:1;
d) a ratio of vinyl groups per molecule as determined by $^{13}$C NMR of at least 50%;
e) an Mn of at least 250 g/mol as determined by 1H NMR; or a combination thereof.

24. The process of claim 1, wherein the polyolefin comprises an Mn of 250 g/mol to 100,000 g/mol.

25. The process of claim 1, wherein the polyolefin comprises at least 1.0 branches having 7 or more carbon atoms per 1000 carbon atoms polymer.

26. The process of claim 1, wherein the polyolefin comprises a Tm of 110° C. or more.

27. The process of claim 1, wherein the polyolefin comprises a density of greater than 0.96 g/cc.

28. The process of claim 1, wherein the polyolefin comprises a branching index g'vis of 0.90 or less.

29. The process of claim 1, wherein the polyolefin comprises propylene.

30. The process of claim 22, wherein the polyolefin comprises:
a) at least 0.5 branches having 7 or more carbon atoms per 1000 carbon atoms polymer;
b) a Tm of 100° C. or more determined by DSC;
c) a ratio of saturated chain ends to allyl chain ends of 1:1 to 5:1;
d) a ratio of vinyl groups per molecule as determined by $^{13}$C NMR of at least 50%;
e) an Mn of at least 250 g/mol as determined by 1H NMR; or a combination thereof.

31. The process of claim 22, wherein the polyolefin comprises an Mn of 250 g/mol to 100,000 g/mol.

32. The process of claim 22, wherein the polyolefin comprises at least 1.0 branches having 7 or more carbon atoms per 1000 carbon atoms polymer.

33. The process of claim 22, wherein the polyolefin comprises a Tm of 110° C. or more.

34. The process of claim 22, wherein the polyolefin comprises less than 1400 ppm aluminum as determined by ICPES, less than 1400 ppm of the Group 4, 5, or 6 transition metal, as determined by ICPES, or a combination thereof.

35. The process of claim 22, wherein the polyolefin comprises a density of greater than 0.96 g/cc.

36. The process of claim 22, wherein the polyolefin comprises a branching index g'vis of 0.90 or less.

37. The process of claim 22, wherein the polyolefin further comprises propylene.

* * * * *